(12) United States Patent
Bertrand et al.

(10) Patent No.: US 7,778,151 B2
(45) Date of Patent: Aug. 17, 2010

(54) EFFICIENT SCHEDULING REQUEST CHANNEL FOR WIRELESS NETWORKS

(75) Inventors: Pierre Bertrand, Antibes (FR); Jing Jiang, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 530 days.

(21) Appl. No.: 11/866,912

(22) Filed: Oct. 3, 2007

(65) Prior Publication Data
US 2008/0080472 A1   Apr. 3, 2008

(30) Foreign Application Priority Data
Oct. 3, 2006 (EP) .................................. 06291566
Apr. 30, 2007 (EP) .................................. 07290534

(51) Int. Cl.
*H04J 11/00* (2006.01)
(52) U.S. Cl. ..................... 370/208; 370/210; 370/328; 375/130
(58) Field of Classification Search ....................... None
See application file for complete search history.

(56) References Cited

U.S. PATENT DOCUMENTS

| | | | | |
|---|---|---|---|---|
| 7,317,747 | B2 * | 1/2008 | Miyazaki et al. | 375/136 |
| 7,426,175 | B2 * | 9/2008 | Zhuang et al. | 370/203 |
| 7,599,327 | B2 * | 10/2009 | Zhuang | 370/329 |
| 7,701,919 | B2 * | 4/2010 | Ah Lee | 370/344 |
| 7,706,458 | B2 * | 4/2010 | Mody et al. | 375/260 |
| 2004/0165650 | A1 * | 8/2004 | Miyazaki et al. | 375/141 |
| 2006/0078004 | A1 * | 4/2006 | Partyka | 370/503 |
| 2006/0153283 | A1 * | 7/2006 | Scharf et al. | 375/148 |
| 2007/0165588 | A1 * | 7/2007 | McCoy | 370/344 |
| 2007/0183386 | A1 * | 8/2007 | Muharemovic et al. | 370/344 |
| 2008/0039107 | A1 * | 2/2008 | Ma et al. | 455/450 |

(Continued)

OTHER PUBLICATIONS

Motorola, Synchronized Random Access Channel Design, 3GPP TSG RAN1#45, R1-061167, Agenda Item: 11.1.2, May 8-May 12, 2006.

(Continued)

*Primary Examiner*—Bob A Phunkulh
(74) *Attorney, Agent, or Firm*—Mima Abvad; W. James Brady; Frederick J. Telecky, Jr.

(57) ABSTRACT

In a method for transmitting a contention free scheduling request in a cellular network, a set of N frequency opportunities is defined within a scheduling request slot. A set of R CAZAC root sequences is then defined per frequency opportunity. A set of C cyclic shifts is then defined per CAZAC root sequence. Within a given cell, a unique identification number is assigned to each user equipment (UE) that is in an uplink (UL) synchronized state. Each UL synchronized UE is mapped to a unique combination of one of the N frequency opportunities, one of the R CAZAC root sequences and one of the C cyclic shifts. A cyclic shifted preamble sequence for a given UE is transmitted as a scheduling request on the mapped frequency, CAZAC root sequence and cyclic shift opportunity, wherein the unique identification number of the given UE is encoded by the combination of the frequency opportunity, CAZAC root sequence opportunity, and amount of cyclic shift, such that up to all of the plurality of UE can transmit a schedule request (SR) in a non-contentious manner in one schedule request slot.

23 Claims, 12 Drawing Sheets

U.S. PATENT DOCUMENTS

2008/0080461 A1* 4/2008 Lee ............................ 370/342
2008/0123616 A1* 5/2008 Lee ............................ 370/344

OTHER PUBLICATIONS

Zte, Random access preamble and message, 3GPP TSG RAN WG1 #45, Tdoc R1-061260, Agenda Item: 11.1.2, Shanghai, China, May 8-12, 2006.

Ericsson, On Synchronous Random Access, TSG-RAN WG1 #45 R1-061370, R1-061370, Agenda Item: 11.1.2, Shanghai, China, May 8-12, 2006.

Motorola, LS on Random Access burst message size for LTE, RAN1, 3GPP TSG RAN WG1 Meeting #45, R1-061599, Shanghai, China, May 8-12, 2006.

* cited by examiner

EFFICIENT SCHEDULING REQUEST CHANNEL FOR WIRELESS NETWORKS

CROSS-REFERENCE TO RELATED APPLICATIONS

The present application claims priority to and incorporates by reference EP provisional application No. 06291566.5, filed on Oct. 3, 2006, entitled "An Efficient Synchronized Random Access Physical Channel for E-UTRA." The present application also claims priority to and incorporates by reference herein EP provisional application No. 07290534.2 filed Apr. 30, 2007, entitled "A Flexible Contention-Free Preamble-Based Scheduling Request Channel for Wireless Networks"

FIELD OF THE INVENTION

This invention generally relates to wireless cellular communication, and in particular to a scheduling request channel for use in orthogonal and single carrier frequency division multiple access (OFDMA) (SC-FDMA) systems.

BACKGROUND OF THE INVENTION

The Global System for Mobile Communications (GSM: originally from Groupe Spécial Mobile) is currently the most popular standard for mobile phones in the world and is referred to as a 2G (second generation) system. Universal Mobile Telecommunications System (UMTS) is one of the third-generation (3G) mobile phone technologies. Currently, the most common form uses W-CDMA (Wideband Code Division Multiple Access) as the underlying air interface. W-CDMA is the higher speed transmission protocol designed as a replacement for the aging 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the older TDMA (Time Division Multiple Access) signaling method of GSM networks.

Orthogonal Frequency Division Multiple Access (OFDMA) is a multi-user version of the popular Orthogonal Frequency-Division Multiplexing (OFDM) digital modulation scheme. Multiple access is achieved in OFDMA by assigning subsets of sub-carriers to individual users. This allows simultaneous low data rate transmission from several users. Based on feedback information about the channel conditions, adaptive user-to-sub-carrier assignment can be achieved. If the assignment is done sufficiently fast, this further improves the OFDM robustness to fast fading and narrow-band co-channel interference, and makes it possible to achieve even better system spectral efficiency. Different number of sub-carriers can be assigned to different users, in view to support differentiated Quality of Service (QoS), i.e. to control the data rate and error probability individually for each user. OFDMA is used in the mobility mode of IEEE 802.16 WirelessMAN Air Interface standard, commonly referred to as WiMAX. OFDMA is currently a working assumption in 3GPP Long Term Evolution (LTE) downlink. Also, OFDMA is the candidate access method for the IEEE 802.22 "Wireless Regional Area Networks".

NodeB is a term used in UMTS to denote the BTS (base transceiver station). In contrast with GSM base stations, NodeB uses WCDMA or OFDMA as air transport technology, depending on the type of network. As in all cellular systems, such as UMTS and GSM, NodeB contains radio frequency transmitter(s) and the receiver(s) used to communicate directly with the mobiles, which move freely around it. In this type of cellular networks the mobiles cannot communicate directly with each other but have to communicate with the BTSs Traditionally, the NodeBs have minimum functionality, and are controlled by an RNC (Radio Network Controller). However, this is changing with the emergence of High Speed Downlink Packet Access (HSDPA), where some logic (e.g. retransmission) is handled on the NodeB for lower response times and in 3GPP long term evolution (LTE) wireless networks (a.k.a. E-UTRA—Evolved Universal Terrestrial Radio Access Network) almost all the RNC functionalities have moved to the NodeB. A Node B is generally a fixed station and may be called a base transceiver system (BTS), an access point, a base station, or various other names.

In WCDMA and OFDMA the cells' size is not constant (a phenomenon known as "cell breathing"). This requires a careful planning in 3G (UMTS) networks. Power requirements on NodeBs and UE (user equipment) are typically lower than in GSM.

A NodeB can serve several cells, also called sectors, depending on the configuration and type of antenna. Common configuration include omni cell (360°), 3 sectors (3×120°) or 6 sectors (3 sectors 120° wide overlapping with 3 sectors of different frequency).

High-Speed Packet Access (HSPA) is a collection of mobile telephony protocols that extend and improve the performance of existing UMTS protocols. Two standards HSDPA and HSUPA have been established. High Speed Uplink Packet Access (HSUPA) is a packet-based data service of Universal Mobile Telecommunication Services (UMTS) with typical data transmission capacity of a few megabits per second, thus enabling the use of symmetric high-speed data services, such as video conferencing, between user equipment and a network infrastructure.

An uplink data transfer mechanism in the HSUPA is provided by physical HSUPA channels, such as an Enhanced Dedicated Physical Data Channel (E-DPDCH), implemented on top of the uplink physical data channels such as a Dedicated Physical Control Channel (DPCCH) and a Dedicated Physical Data Channel (DPDCH), thus sharing radio resources, such as power resources, with the uplink physical data channels. The sharing of the radio resources results in inflexibility in radio resource allocation to the physical HSUPA channels and the physical data channels.

The signals from different users within the same cell may interfere with one another. This type of interference is known as the intra-cell interference. In addition, the base station also receives the interference from the users transmitting in neighboring cells. This is known as the inter-cell interference When an orthogonal multiple access scheme such as Single-Carrier Frequency Division Multiple Access (SC-FDMA)—which includes interleaved and localized Frequency Division Multiple Access (FDMA) or Orthogonal Frequency Division Multiple Access (OFDMA)—is used; intra-cell multi-user interference is not present. This is the case for the next generation of the $3^{rd}$ generation partnership project (3GPP) enhanced-UTRA (E-UTRA) system—which employs SC-FDMA—as well as IEEE 802.16e also known as Worldwide Interoperability for Microwave Access (WiMAX)—which employs OFDMA, In this case, the fluctuation in the total interference only comes from inter-cell interference and thermal noise which tends to be slower. While fast power control can be utilized, it can be argued that its advantage is minimal.

In the uplink (UL) of OFDMA frequency division multiple access (both classic OFDMA and SC-FDMA) communication systems, it is beneficial to provide orthogonal reference signals (RS), also known as pilot signals, to enable accurate channel estimation and channel quality indicator (CQI) estimation enabling UL channel dependent scheduling, and to enable possible additional features which require channel sounding.

Channel dependent scheduling is widely known to improve throughput and spectral efficiency in a network by having the NodeB, also referred to as base station, assign an appropriate modulation and coding scheme for communications from and to a user equipment (UE), also referred to as mobile, depending on channel conditions such as the received signal-to-interference and noise ratio (SINR). In addition to channel dependent time domain scheduling, channel dependent frequency domain scheduling has been shown to provide substantial gains over purely distributed or randomly localized (frequency hopped) scheduling in OFDMA-based systems. To enable channel dependent scheduling, a corresponding CQI measurement should be provided over the bandwidth of interest. This CQI measurement may also be used for link adaptation, interference co-ordination, handover, etc.

Several control signaling information bits on downlink transmission need to be transmitted in uplink, as described in 3GPP TR 25.814 v7.0.0. $3^{rd}$ Generation Partnership Project; Technical Specification Group Radio Access Network; Physical layer aspects for evolved Universal Terrestrial Radio Access (UTRA). For example, downlink hybrid Automatic Repeat reQest (ARQ) (HARQ) requires a 1-bit ACK/NACK in uplink for each received downlink transport block. Further, the downlink channel quality indicator (CQI) needs to be feedback in the uplink to support frequency selective scheduling in the downlink. When a UE (user equipment) has uplink data transmission, the downlink ACK/NACK and/or CQI can be transmitted along with the uplink data, in which the uplink reference signal can be used for coherent demodulation of the uplink data, as well as the downlink ACK/NACK and/or CQI. In case there is no uplink data transmission, a reference signal can be transmitted for coherent demodulation of the downlink ACK/NACK and/or CQI. Thus, multiple dedicated time-frequency resource blocks are necessary for the reference signal and the ACK/NACK and/or CQI. While CQI may be transmitted less frequently based on a periodic or trigged mechanism, ACK/NACK needs to be transmitted in a timely manner for every received downlink transport block to support HARQ. Note that ACK/NACK is sometimes denoted as ACKNAK or just simply ACK, or any other equivalent term.

User equipments (UEs) of an E-UTRAN network are time and frequency multiplexed on a shared channel (SCH) such that time and frequency synchronization are required. The scheduler, in the base-station, has full control of the time and frequency locations of uplink transmissions for all connected user devices, except for UE autonomous transmissions through either the non-synchronized random access (RA) channel or the scheduling request (SR) channel. To enable proper scheduling and multi-UE management, each UE should be uniquely identified to a base-station. The 3GPP working groups have proposed a 16-bit identifier (ID) for UE's, which represents significant overhead costs for uplink and downlink control signaling in an E-UTRAN network because, in practical implementations, at most a few hundred UE's (compared to $2^{16}$) will be maintained in uplink synchronization. An uplink synchronized UE can request and have access to uplink transmissions faster than a non-synchronized UE, which first needs to recover synchronization.

In E-UTRA, the non-synchronized random access (RA) channel is a contention-based channel multiplexed with scheduled data in a TDM/FDM manner. It is accessible during RA slots of duration $T_{RA}$ and period $T_{RA}$.

SUMMARY OF THE INVENTION

An embodiment of the present invention provides an efficient physical channel definition that, at low overhead cost, provides a fast and robust means for UL synchronized UE's without UL scheduling grants to send new scheduling requests to the Node B.

BRIEF DESCRIPTION OF THE DRAWINGS

In the following detailed description, reference will be made to the accompanying drawings, in which.

Figure 1:
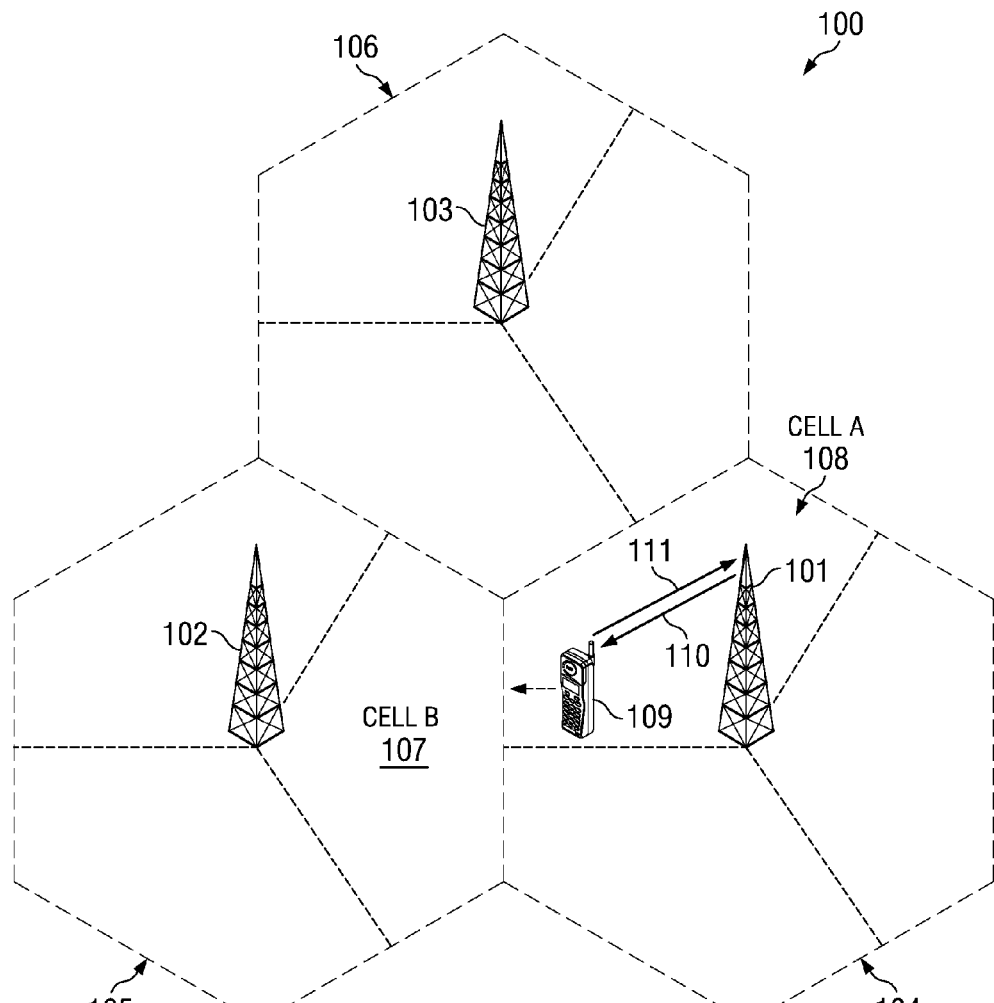
FIG. 1 shows an illustrative telecommunications network.

The drawings show illustrative embodiments that will be described in detail. However, the description and accompanying drawings are not intended to limit the claimed present disclosure to the illustrative embodiments, but to the contrary, the intention is to disclose and protect all modifications, equivalents, and alternatives falling within the spirit and scope of the appended claims.

DETAILED DESCRIPTION

Each user device in the uplink synchronized state is allocated uplink resources of a base-station and is assigned, on top of its radio resource control/medium access control (RRC/MAC) 16-bit identifier (C-RNTI), a unique uplink physical layer identifier to temporarily ensure non-contentious uplink transmissions via a shared communication channel or a scheduling request channel. The group of user devices in the uplink non-synchronized state are not assigned any additional physical layer identifier and thus the total number of bits needed for the uplink physical layer identifier in the uplink synchronized state can be reduced to improve efficiency of the control signaling scheme. In at least some embodiments, each user device in the uplink non-synchronized state cannot send uplink transmissions until successfully requesting uplink resources and uplink synchronization from the base-station. The uplink synchronized state is hereafter referred to as a "synchronized state" and the uplink non-synchronized state is hereafter referred to as a "non-synchronized state". Also, the unique uplink physical layer identifier is hereafter referred to as a "reduced identifier" or a "unique identifier". Thus, it should be noted that embodiments described by these terms are not limited to uplink synchronization or to unique uplink physical layer identifiers.

In at least some embodiments, the assignment of user devices into the synchronized state and the non-synchronized state is temporary. For example, upon a successful request for uplink resources (also referred to as uplink scheduling grant), a non-synchronized user device can be reassigned to the synchronized state and receives a reduced identifier to enable uplink transmissions and contention-free scheduling requests. On the other hand, if more than a threshold amount of time passes without an uplink transmission or a timing adjustment (TA) command from the base-station, a user device in the synchronized state can be reassigned to the non-synchronized state and the reduced identifier corresponding to the reassigned user device is released. The reduced identifier can be of any form e.g. explicit, or also implicit in the form of a unique physical resource on the contention-free scheduling request channel.

The scheduling request (SR) channel is used by UEs that are UL synchronized, have no scheduling grants, and need to send a scheduling request. An extended preamble format for use in the SR channel will be described in more detail below. It is assumed that the SR channel is not needed for any other purpose and that UL synchronization maintenance is either performed through the regular UL scheduled transmissions for UEs with scheduling grants, periodically assigned reference signals such as sounding reference signals (SRS), or through the non-synchronous random access (RA) mechanism for UEs without scheduling grants. RA operation is described in more detail in U.S. patent application Ser. No. 11/691,549 filed 27 Mar. 2007, entitled "Random Access Structure For Wireless Networks" and is incorporated by reference herein. Synchronization maintenance is described in more detail in U.S. patent application Ser. No. 11/858,860 filed 20 Sep. 2007, entitled "Uplink Synchronization Maintenance in Wireless Networks" and is incorporated by reference herein.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be handed over to base station 102. Because UE 109 is synchronized with base station 101, UE 109 must employ non-synchronized random access to initiate handover to base station 102.

While still in cell A 108, UE 109 also employs synchronous scheduling requests to request allocation of up-link 111 time or frequency or code resources. If UE 109 has data ready for transmission, for example, traffic data, measurements report, tracking area update, etc., UE 109 can transmit a scheduling request signal on up-link 111. The scheduling request notifies base station 101 that UE 109 requires up-link resources to transmit the UE's data. Base station 101 responds by transmitting to UE 109, via down-link 110, a message containing the parameters of the resources allocated for UE 109 up-link transmission along with a possible timing error correction. After receiving the resource allocation and a possible timing advance message transmitted on down-link 110 by base station 101, UE 109 (possibly) adjusts its transmit timing and transmits the data on up-link 111 employing the allotted resources during the prescribed time interval.

Figure 2:
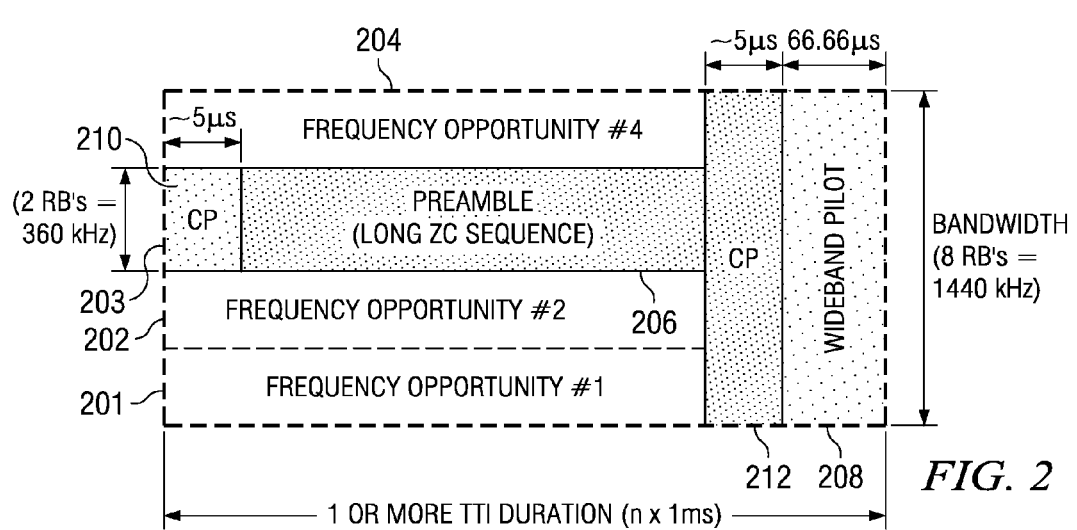
FIG. 2 shows an illustrative up-link time/frequency allocation for a scheduling request in the network of FIG. 1.

FIG. 2 illustrates the structure of the SR slot with preamble format. It is made of four frequency blocks 201-204, which provide four orthogonal resource opportunities for transmitting a preamble. FIG. 2 illustrates an example where a preamble 206 is transmitted in frequency opportunity #3 203. The size of each frequency block is two resource blocks (RB), which, in one embodiment corresponds to 360 kHz. Thus, the total bandwidth allocated to a SR slot is eight RB's=1.44 MHz. The preamble is followed by a wideband pilot 208 that spans the whole SR slot bandwidth, 1.44 MHz. With such a structure, a three-step procedure is used to transmit the scheduling request, where the second step is the scheduling request response from the NodeB to the UE and the third step is scheduled on the UL SCH which will be described in more detail below. In one embodiment, this first post-preamble scheduled UL transmission is frequency scheduled in a localized manner within the same bandwidth as that occupied by the SR wideband pilot. Therefore, the wideband pilot 210 provides means for channel sounding to the frequency scheduler. Multiplexing pilots of multiple received preambles will be discussed in more detail below. Both preamble 206 and wideband pilot 208 have a respective cyclic prefix (CP) 210, 212 so as to guarantee the signal's orthogonality in the frequency domain while enabling a simple frequency domain detection method. The total length of CP1 210 and CP2 212 is set to approximately 5 µs, to cope with a conservative delay spread duration encountered in urban environments, for 1 ms SR slot duration, but the individual length of each depends on the system bandwidth as it is required that the wideband RS OFDM symbol be time-aligned with the last OFDM symbol in each data TTI on PUSCH. Therefore, there is no interference between the wideband RS and data.

In this embodiment, the SR slot is scheduled every 10 ms, so as to keep the average waiting time of a scheduling request to 5 ms.

Preamble Sequence

The preamble sequence is a long constant amplitude zero autocorrelation (CAZAC) complex sequence allocated to the UE among a set of $R_S$ possible sequences. These sequences are built from cyclic shifts of a CAZAC root sequence. If additional sequences are needed, then from cyclic shifts of other CAZAC root sequences.

Well known examples of CAZAC sequences include, but are not limited to: Chu Sequences, Frank-Zadoff Sequences, Zadoff-Chu (ZC) Sequences, and Generalized Chirp-Like (GCL) Sequences. A known set of sequences with CAZAC property is the Zadoff-Chu N-length sequences defined as follows $$a_k = \exp\left[j2\pi \frac{M}{N}\left(\frac{k(k+1)}{2} + qk\right)\right] \quad (1)$$

where M is relatively prime to N, N odd, and q any integer.

The latter constraint on N also guarantees the lowest and constant-magnitude cross-correlation $\sqrt{N}$ between N-length sequences with different values of M: $M_1$, $M_2$ such that ($M_1$-$M_2$) is relatively prime to N. As a result, choosing N a prime number always guarantees this property for all values of M<N, and therefore maximizes the set of additional sequences, non orthogonal, but with optimal cross-correlation property. On top of providing additional sequences for a UE to chose among in a given cell, these sequences are also intended to be used in neighboring cells, so as to provide good inter-cell interference mitigation.

A same or similar sequence has been proposed for use for the RA burst preamble. Therefore using this sequence for the SR preamble simplifies the SR implementation in both UE and NodeB.

Cyclic Shift Dimensioning

Figure 3:
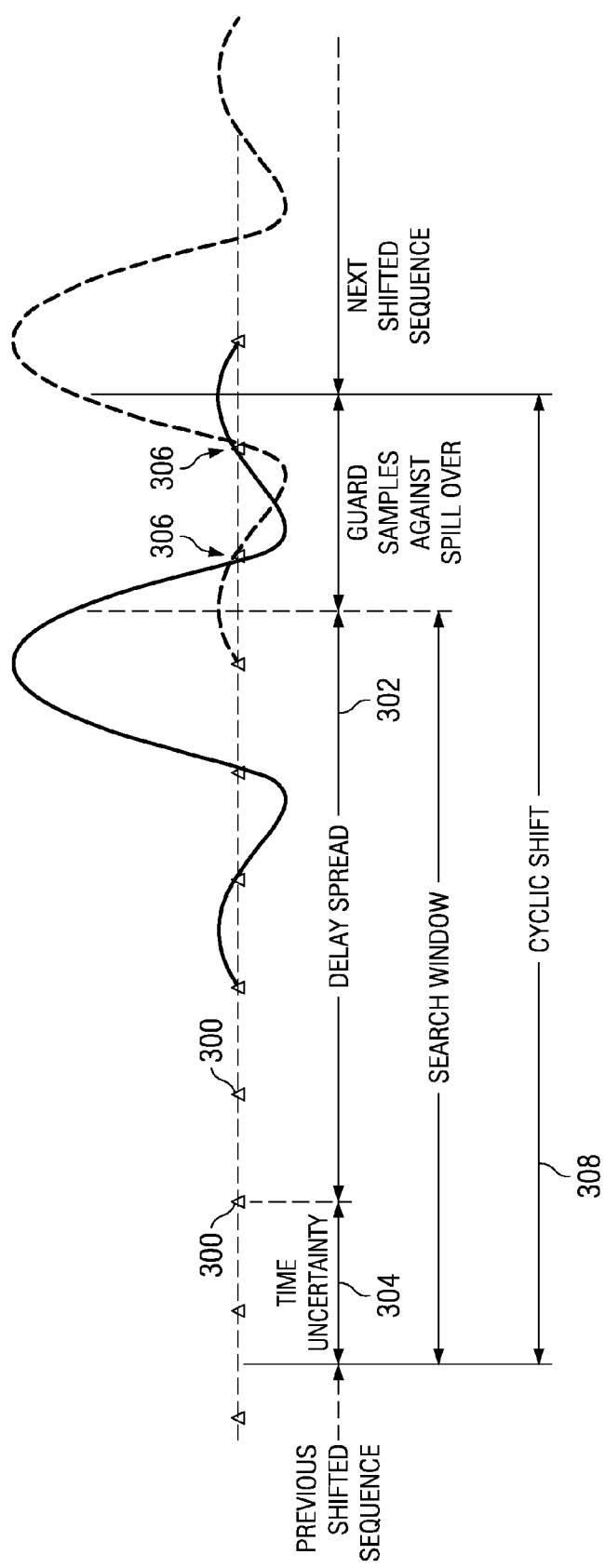
FIG. 3 is a time plot illustrating cyclic shift dimensioning for the preamble of FIG. 2.

FIG. 3 is a time plot illustrating cyclic shift dimensioning for preamble 206 of FIG. 2. The preamble contains a sequence of symbols 300. The cyclic shift offset is dimensioned to guarantee the orthogonality of the sequences regardless the delay spread 302 and time uncertainty 304 of the UE's. This is also known as the zero correlation zone (ZCZ) of the sequences. As a result, the minimum cyclic shift offset is the first integer number of sequence symbol periods that is greater than the maximum delay spread and time uncertainty of an UL synchronized UE. However, as shown in FIG. 3, some additional guard samples 306 are needed to prevent the last/first path of a given shifted sequence from spilling over the next/previous shifted sequence search window and create some false alarm. The spill over effect is due to the pulse shape filter envelope present in the power delay profile built by the SR receiver to detect the presence/absence of the different shifted sequences. As a result, for this embodiment, the following numerical values for cyclic shift dimensioning are used:

max time uncertainty: 1 µs
max delay spread: 5 µs
number of additional guard samples: 2

As will be described in more detail later with regard to Table 1, the present embodiment uses a 326.54 kHz preamble sampling rate for the 1 ms SR slot, this total time is upper rounded to a cyclic shift increment 308 of four sequence symbols, which after removing the two guard symbols leaves room for a total time uncertainty+delay spread of 6 µs.

Spreading the Cyclic Shifts Over the Preamble Duration

When there is some room left after allocating all cyclic shifts on a root sequence, further isolation between ZCZ sequences can be obtained by spreading the cyclic shifts over the preamble duration. As will be described with regard to Table 2, the present embodiment requires 64 ZCZ sequences per mother sequence with the 1 ms SR slot. With a chosen sequence length of 331 symbols, 64 unique sequences can be generated as a combination of: 54 sequences shifted by 5 samples from the previous sequence, and 10 sequences shifted by 6 samples from the previous sequence.

Preamble Bandwidth

Unlike in the non-synchronized case, the synchronized SR preamble is not intended to be used for timing advance estimation. As a result, the minimum bandwidth constraint is not driven by the delay estimation accuracy and can be relaxed below 1.25 MHz, as e.g. two LTE RB's=2×12 subcarriers=360 kHz. This reduces the standalone detection performance by 0.5 dB, but provides up to $N_{RB}$=4 frequency resource blocks in the frequency domain. The combined total number of resource opportunities is: $L=R_S N_{RB}$.

Modularity

The preamble-based SR specified above is made of four frequency blocks, which provide four orthogonal resource opportunities for transmitting a preamble. This definition was motivated by the need to maximize the SR UE capacity to support 512 UEs per 5 MHz for the smallest overhead (3.2%). However, in case of moderate to low user density, it can be scaled down to 3, 2, and 1 frequency block(s) to save UL overhead, as shown in Table 1. It should be noted that the wideband RS multiplexing capacity (CDM by cyclic shifting a CAZAC sequence) remains the same in each case: 12.

TABLE 1

SR modularity

| # of frequency blocks | # of UEs per 5 MHz | UL overhead |
|---|---|---|
| 4 | 512 | 3.2% |
| 3 | 384 | 2.5% |
| 2 | 256 | 1.7% |
| 1 | 128 | 1.0% |

Multiplexing Downscaled Versions of SR and PUSCH

Figure 4:
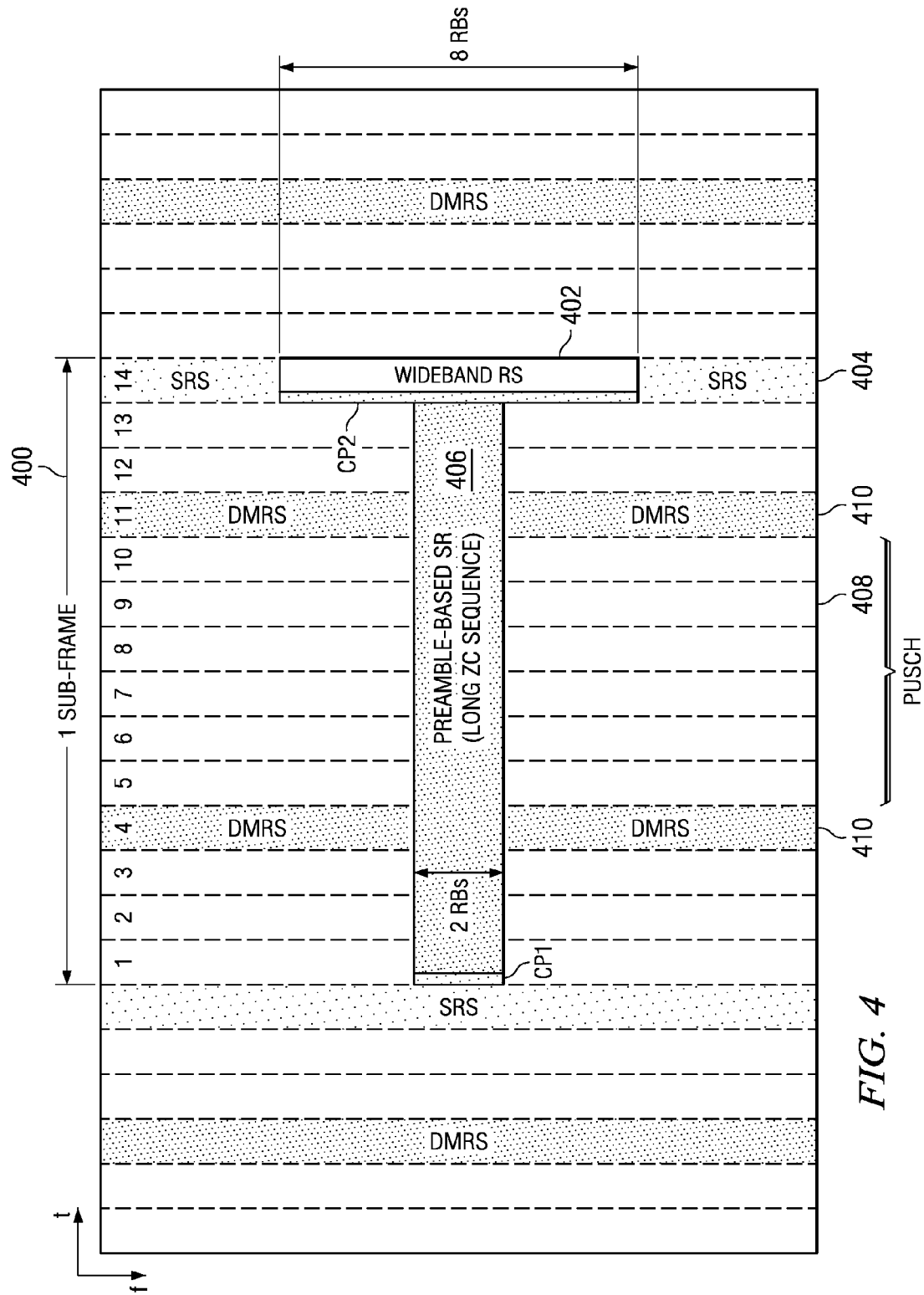
FIG. 4 illustrates a sub-frame that includes the scheduling request of FIG. 2.
Figure 5:
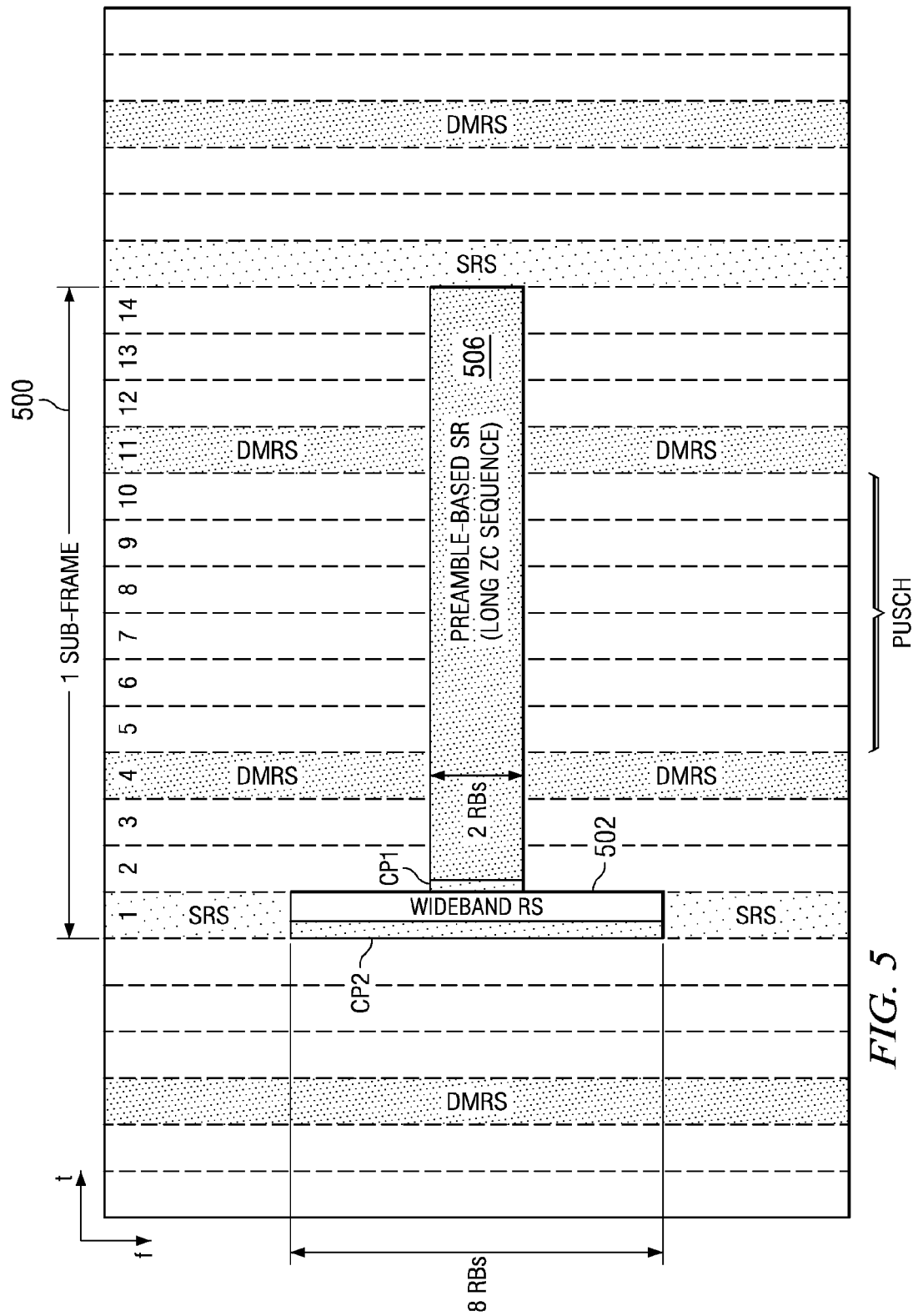
FIG. 5 illustrates an alternative embodiment of a scheduling request.

Down scaled versions of the SR can thus be used when only one, two or three frequency preamble opportunities is/are allocated out of the maximum four frequency opportunities. In that case, PUSCH data can be scheduled around that preamble, except in the symbol used by the wideband RS of the SR. Therefore, in order to minimize the changes and complexity associated to this multiplex, the wideband RS should be located on the PUSCH symbol where the sounding reference signal (SRS) is also located. The SRS is another broadband channel scheduled in a subframe in support of frequency selective scheduling (FSS) and link adaptation. This is compatible with PUSCH data symbols mapping. FIG. 4 and FIG. 5 Error! Reference source not found. illustrate the two options: SRS allocated on the first or last symbol of the sub-frame, respectively.

In FIG. 4, representative sub-frame 400 has fourteen symbols. Wideband RS 402 is located in the last symbol that also includes SRS 404 after preamble 406. In this illustration, preamble 406 is located in the frequency opportunity #3 203, referring back to FIG. 2, but could be located in any one of the four frequency opportunities 201-204. Data symbols 408 may be scheduled in any of the frequency opportunities 201-204 that are not used for a SR preamble. The sub-frame also includes two demodulation reference signal (DMRS) symbols 410.

In FIG. 5, representative sub-frame 500 has fourteen symbols. Wideband RS 502 is located in the first symbol that also includes the SRS before preamble 506. In this illustration, preamble 506 is located in the frequency opportunity #3 203, referring back to FIG. 2, but could be located in any one of the four frequency opportunities 201-204. Data symbols may be scheduled in any of the frequency opportunities 201-204 that are not used for a SR preamble. The sub-frame also includes two demodulation reference signal (DMRS) symbols.

Figure 6:
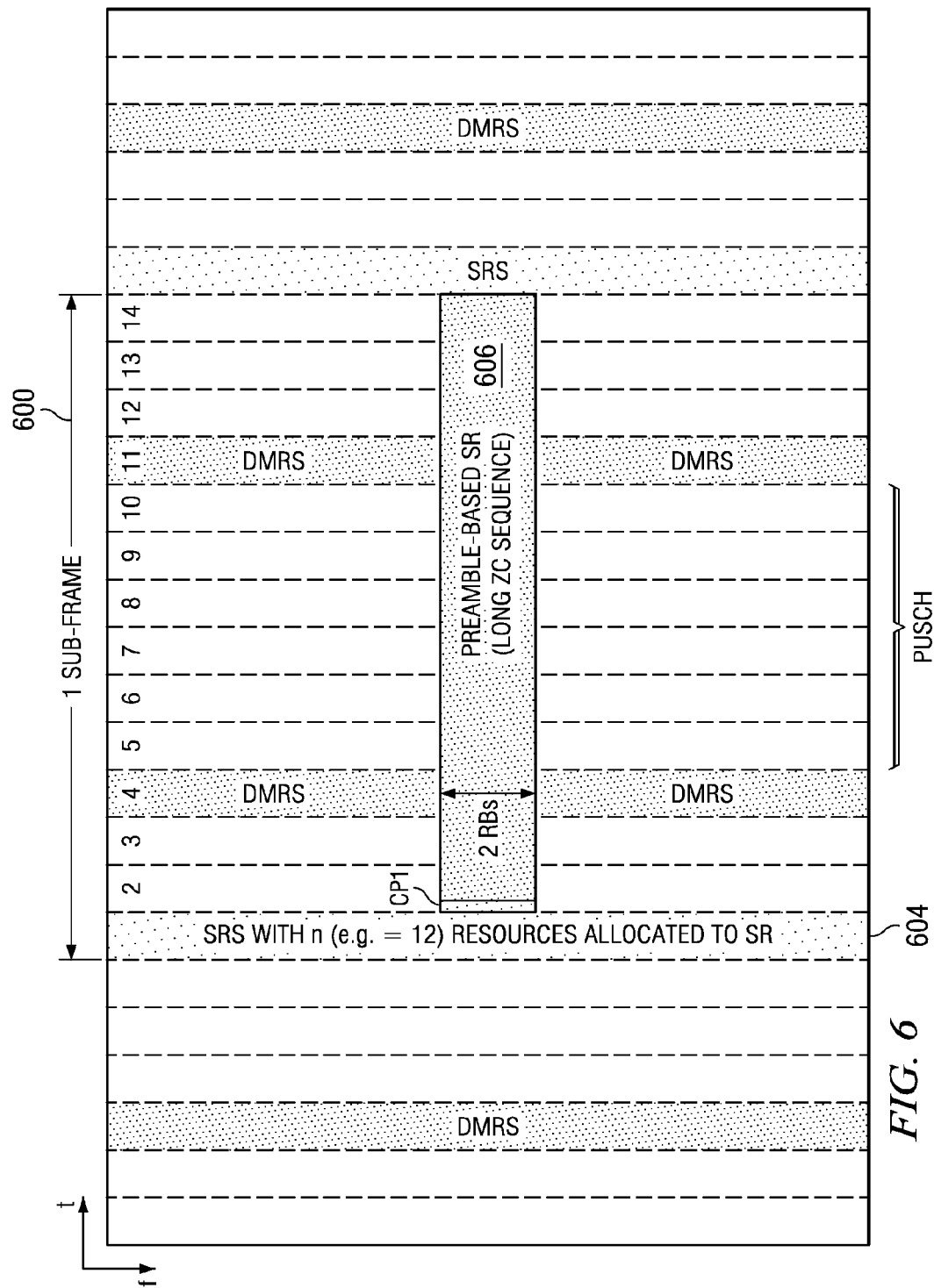
FIG. 6 illustrates another alternative embodiment of a scheduling request.

The potential issue with this approach is that the SRS allocation will have to change every 10 ms (SR period) in order to leave room for the SR's wideband RS. Therefore, another embodiment is to generalize the SR's wideband RS concept to 12 "reserved" SRS resources in the sub-frame where will be scheduled the SR. This is illustrated in FIG. 6. Sub-frame 600 contains SR preamble 606 in the third preamble frequency opportunity, but as discussed above it could be located in any one of the four preamble frequency opportunity defined in FIG. 2. SRS 604 includes 12 reserved resources that are used for the SR wideband RS. The multiplexing of the reserved SRS resources for the SR with other UE's SRSs is done by a combination of CDM and FDM. The FDM multiplex can be done in a localized (consecutive sub-carriers) or in a distributed manner (distributed sub-carriers).

Figure 7:
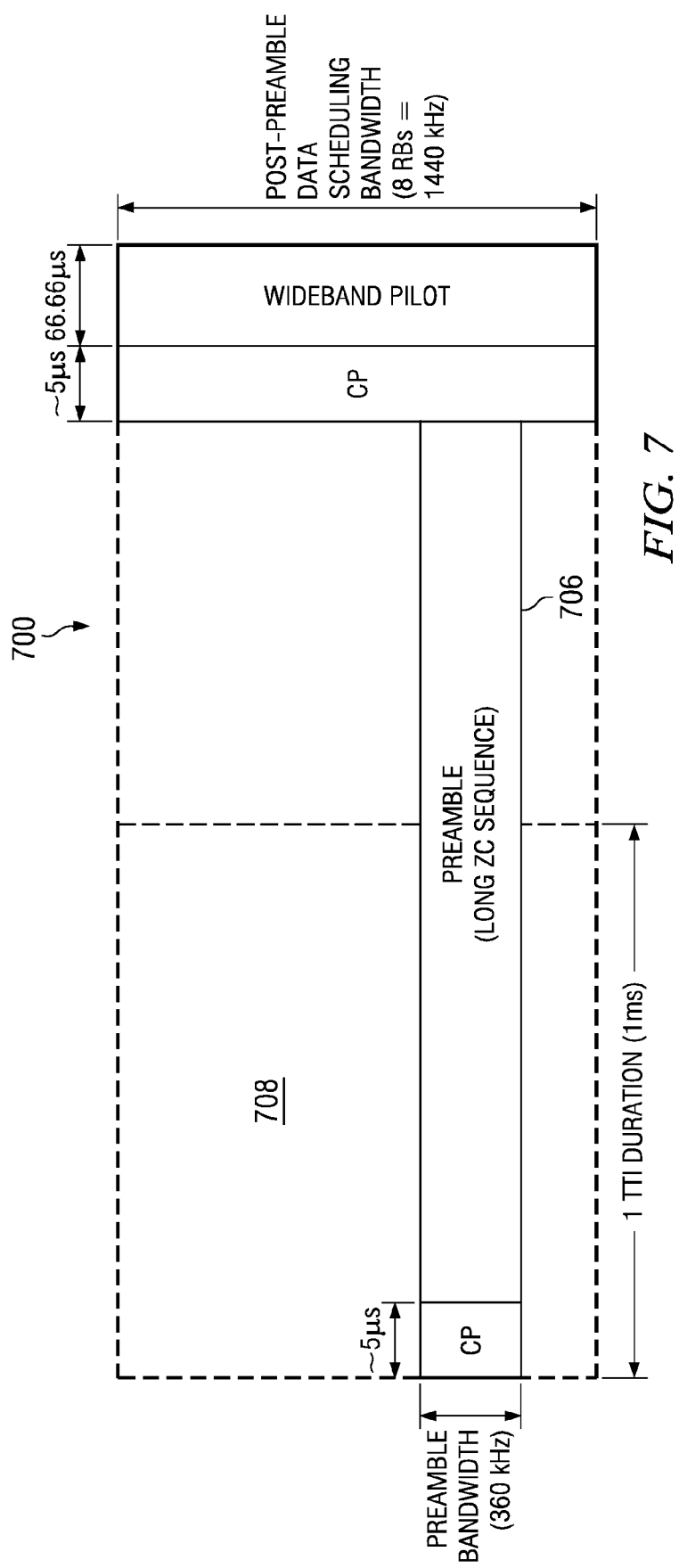
FIG. 7 illustrates another embodiment of a scheduling request that spans two transmission time intervals.

FIG. 7 illustrates another embodiment of a scheduling request 700 that spans two transmission time intervals. For large cells, a 2-sub-frame length SR preamble may be required. However, in order to keep a similar overhead with respect to scheduled data, the total time frequency resource should be kept constant, so the number $N_{RB}$ of frequency blocks should be half of that allocated to the 1-TTI preamble. The number $R_S$ of CAZAC sequences should be doubled to provide the same number L of opportunities, which should be easily obtained by cyclic shifts since the length of the CAZAC sequence has doubled. As discussed above, data symbols 708 may be scheduled in an unused preamble frequency opportunity.

Information Bits

Information bits can be implicitly carried in the preamble of any of the above described embodiments by mapping the preamble signature to a bit sequence. For an n-bit sequence, the corresponding searched signature space size is 2. In this embodiment up to 9 bits of information are mapped in the synchronized SR preamble, which means up to 512 UE can be identified. These bits code the UE reduced ID which identifies uniquely all UL synchronized UE's in RRC_CONNECTED mode. For example, as discussed above there are N=four frequency opportunities provided in the RS slot. If a set R of two CAZAC root sequences are selected for each frequency and each root sequence can be shifted to produce a set C of 64 unique sequences in a 1 ms preamble, then N×R×C=512. Therefore, the scheduling request (SR) preamble can be used in a non-contention based manner to allow up to 512 UE to request scheduling in a single slot.

As discussed above, it is expected that less than 512 UE in RRC_CONNECTED mode will be maintained in UL synchronized state in any given cell. However, for higher loads one or more additional slots may be identified to carry additional scheduling requests. One measure of the worst-case number of active UE's per cell is given by the maximum voice over IP (VOIP) capacity which has been estimated to be 400 UE's per 5 MHz per cell. As a result, one SR slot per 5 MHz bandwidth is sufficient to handle the worst-case capacity of E-UTRA. Efficiency wise, one SR slot per 10 ms results in as low as 3.2% overhead. For reduced loads, for example, if only one SR preamble is required for a maximum of 128 UEs, then the overhead is only 1%.

DFT-SOFDM Transmitter/Receiver Structure

The transmission/reception of the wideband pilot is identical to that of the reference signal used for channel sounding (SRS) in a regular UL sub-frame symbol. As a result, the current sub-section focus on the transmission/reception of the preamble part of the SR burst.

Figure 8:
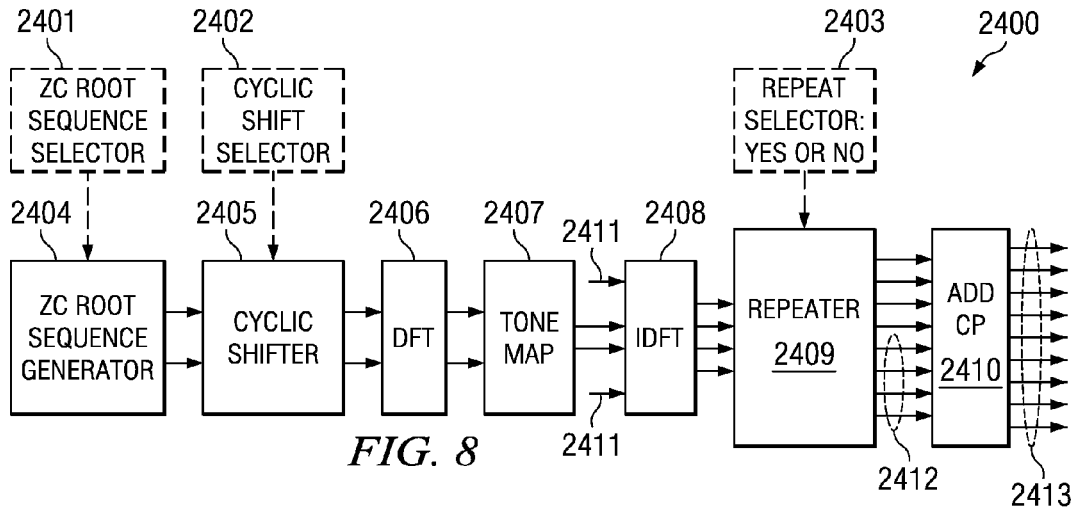
FIG. 8 shows a first illustrative embodiment of a scheduling request signal transmitter.
Figure 9:
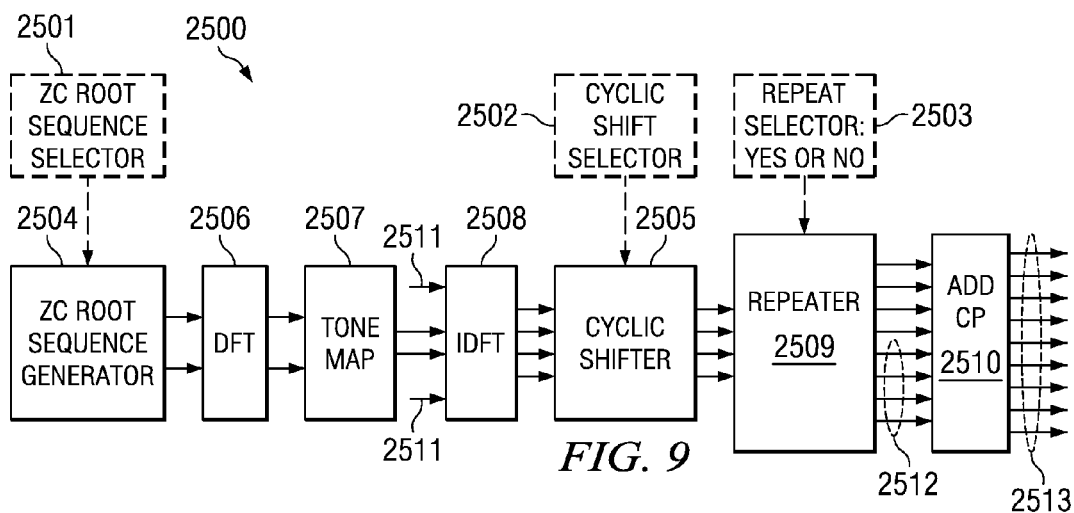
FIG. 9 shows a second illustrative embodiment of a scheduling request signal transmitter.
Figure 10:
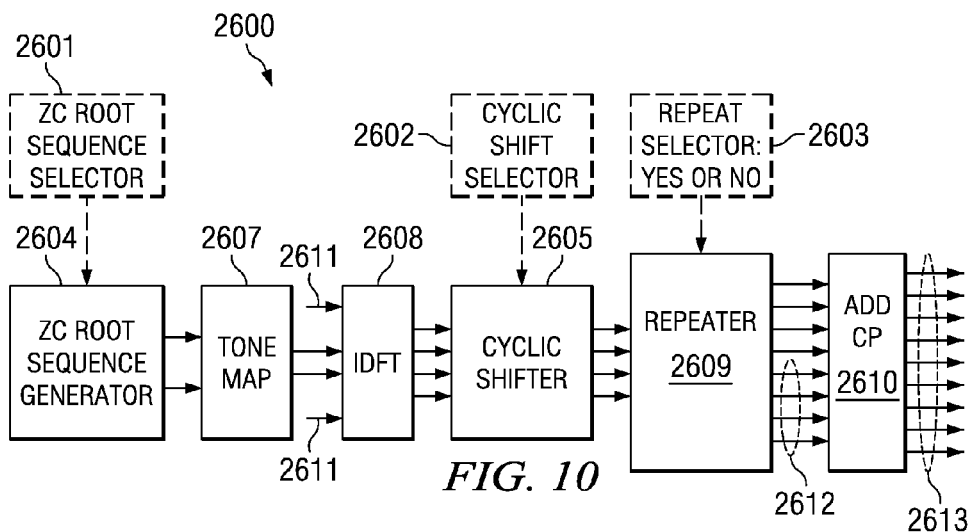
FIG. 10 shows a third illustrative embodiment of a scheduling request signal transmitter.
Figure 11:
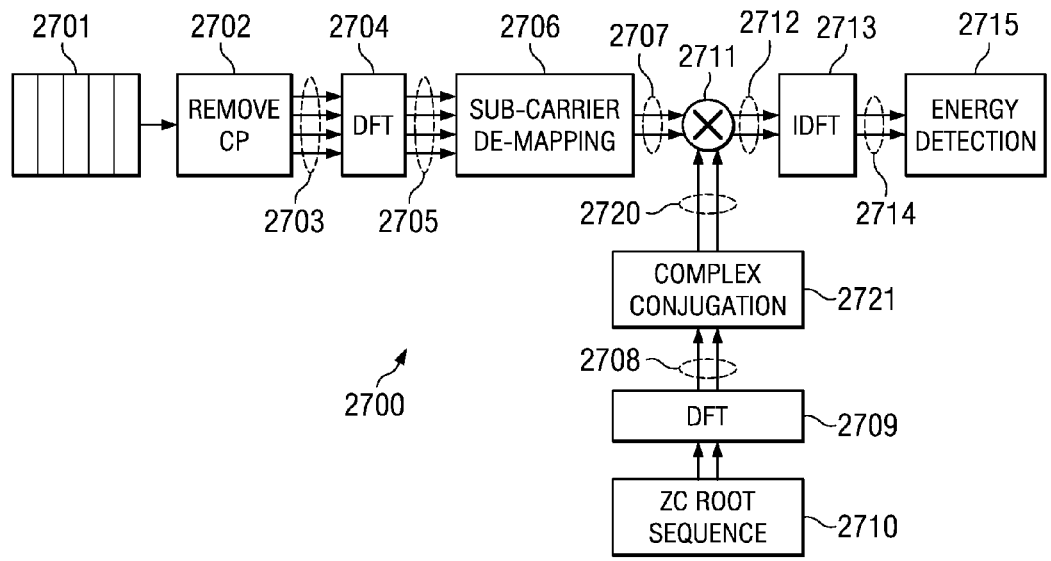
FIG. 11 shows an illustrative embodiment of a scheduling request signal receiver.

FIGS. 8, 9 and 10 describe various embodiments of an SR preamble transmitter and FIG. 11 describes a receiver, both using frequency domain DFT-Spread OFDM (DFT-SOFDM) generation. The notations in Table 2 are used.

TABLE 2

DFT-SOFDM notations $f_s$ is the system sampling rate: 1.92, 3.84, 7.64, 15.36, 23.04, 30.72 MHz for 1.4, 2.5, 5, 10, 15, 20 MHz system bandwidth respectively.
$R_s$ is the preamble sampling rate.
$N_p$ is the preamble sequence length (in the preamble sampling rate).
$N_{cp}$ is the cyclic prefix length (in the system sampling rate).
$T_p$ is the preamble duration.

In Orthogonal Frequency Division Multiplexed ("OFDM") systems. Each tone carries a modulated symbol according to a frequency overlapped time limited orthogonal structure. The frequency tones overlap with each other so that in the center of a tone, the spectral envelopes of all surrounding tones are null. This principle allows multiplexing of different transmissions in the same system bandwidth in an orthogonal manner. However, this only holds true if the sub-carrier spacing δf is kept constant. δf is equal to the inverse of the OFDM symbol duration T, used to generate the frequency tones by DFT. Because the preamble OFDM symbol is longer than the data OFDM symbol, the sub-carrier spacing of the preamble OFDM symbol will be shorter than the sub-carrier spacing of the data OFDM symbol. In addition, since data and preamble OFDM symbols are neither aligned nor have same durations, strict orthogonality cannot be achieved. However, the following design rules aim at minimizing the co-interference between preamble and data OFDM symbols: 1) fixing the preamble OFDM symbol duration to an integer multiple of the data symbol duration provides some commensurability between preamble and data sub-carriers thus providing interference reduction between these sub-carriers, and 2) this also assumes that the preamble sampling frequency is an integer multiple of the data symbol sub-carrier spacing.

The first constraint of this method is that the size of the DFT and IDFT, $N_{DFT}$, must be an integer number:

$$N_{DFT} = f_s T_p = k; \text{ k integer} \quad (2)$$

An additional constraint is to minimize the orthogonality loss in the frequency domain of the preamble sub-carriers and the surrounding UL scheduled data sub-carriers. As mentioned above, this is achieved if the sub-frame symbol sub-carrier spacing $\Delta f_S$ is an integer multiple of the SR preamble sub-carrier spacing $\Delta f_{SR}$:

$$\Delta_{\sim R} = \frac{f_s}{N_{DFT}} = \frac{1}{T_p} = \frac{1}{kT_S} = \frac{1}{k}\Delta_\sim; \text{ k integer} \quad (3)$$

where $T_S$=66.67 μs is the sub-frame symbol duration. In other words, the preamble duration must be an integer multiple of the sub-frame symbol duration:

$$T_p = k T_S; \text{ k integer} \quad (4)$$

An additional benefit of this property is the reusability of the FFT/IFFT components available for mapping/de-mapping the symbols of the UL sub-frame of UL scheduled data in/from the SC-FDMA access scheme. Moreover, it should be possible to implement the large DFT/IDFT blocks, involved in the SR transmitter and receiver to perform similar preamble sub-carrier mapping/de-mapping, through a combination of the elementary FFT/IFFT blocks. This can be done using a Divide-And-Conquer approach, where an n×$2^m$ DFT is implemented with an FFT of $2^m$ samples combined with a DFT of n samples. Equation (4) makes it possible since:

$$N_{DFT} = k f_s T_S = k N_{FFT}; \text{ k integer} \quad (5)$$

Finally note that, since the preamble sequence is a deterministic sequence, a simplified transmitter only needs to store the frequency domain preamble samples and the generation process starts with the sub-carrier mapping.

Preamble Sequence Length/Bandwidth Adjustment

Figure 12:
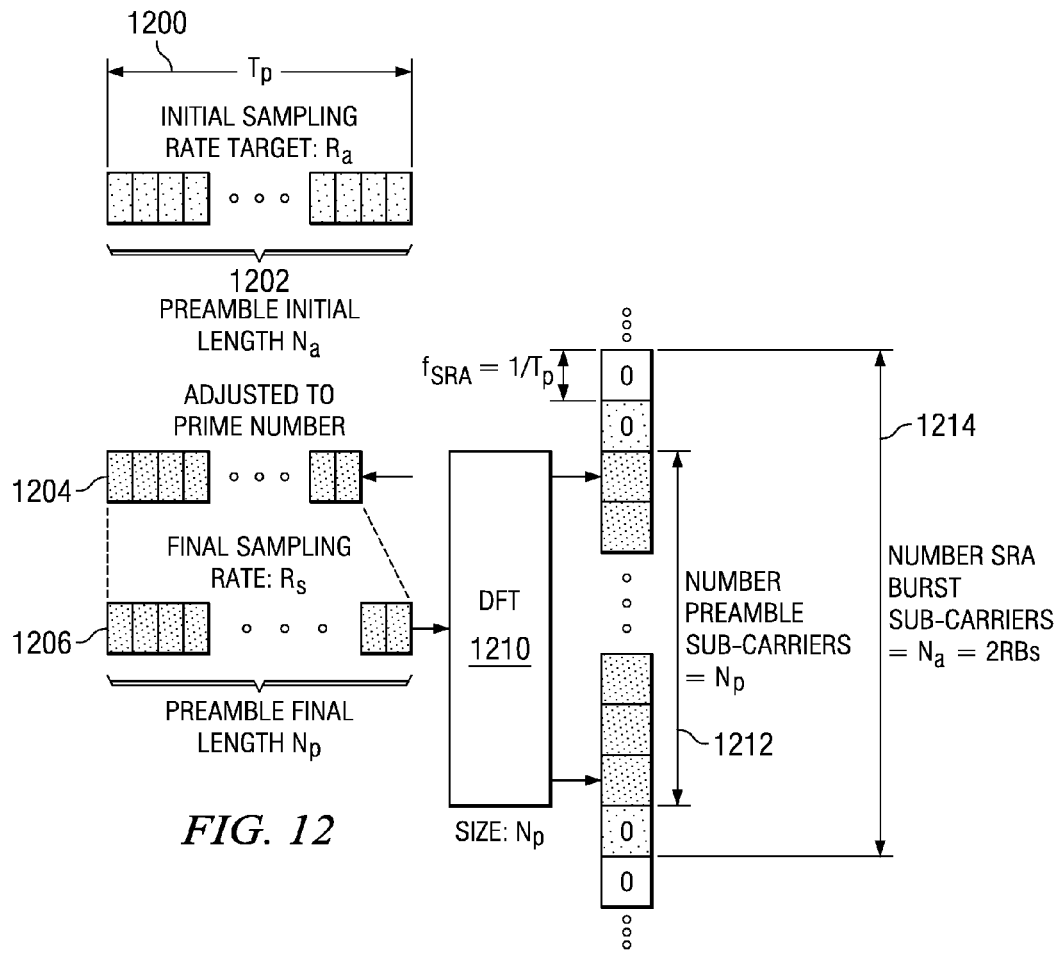
FIG. 12 illustrates the operation of preamble sequence length and bandwidth adjustment to prime-length sequence in the above embodiments of a scheduling request.

In OFDM systems, different UEs' transmissions are dynamically allocated to different non overlapping frequency bands. This allocation is generally based on a minimum frequency granularity, called a resource block (RB). In order to facilitate the frequency multiplexing of the random access preamble and the data transmission, the preamble should be allocated an integer number of resource blocks It is a common understanding that Zadoff-Chu (ZC) sequences exhibit powerful interference mitigation properties when the sequence length is a prime number. Therefore, the transmitter embodiments discussed herein have provisions for adjusting the sequence length. This section addresses how to handle such sequence length adjustment with the DFT-SOFDM transmitter structure, as illustrated in FIG. 12.

The preamble duration $T_P$ 1200 is chosen to comply with both the SR preamble structure as shown in FIG. 2 and SC-FDMA generation constraint reflected by equation (4);

An initial preamble reference length $N_a$ 1202, in samples, is derived from the initial sampling rate target $R_a$, based on the SR preamble allocated bandwidth $R_a$=2 RBs=360 kHz, $N_a=T_P R_a$. The reference length is shortened to the closest prime number $N_p$ 1204 and a corresponding $N_p$-length sequence is generated. Since the sequence duration remains $T_P$, the adjusted preamble sampling rate 1206 is $R_s=R_a N_p/N_a$. A DFT 1210 transforms the $N_p$ time samples into $N_p$ frequency tones. The $N_p$ frequency tones are mapped onto sub-carriers 1212 allocated by the NodeB to the SR preamble frequency block.

Since $N_a$ sub-carriers 1214 (=2 RBs=360 kHz) are allocated to the SR preamble and the generated preamble occupies only $N_p$ sub-carriers, then the additional $N_a$-$N_p$ subcarriers are set to zero and evenly distributed around the preamble sub-carriers, so as to further isolate the preamble from surrounding RB's or preambles.

A careful design of the preamble isolation from surrounding RB's allocation can be done by shortening the reference length discussed above not to the closest prime number, but instead to a prime number optimized to provide the desired guard band isolation.

A simplified transmitter only needs to store in a look-up table (LUT) the frequency domain preamble samples and the generation process starts with the sub-carrier mapping.

Table 3 shows, for each structure, given the minimum cyclic shift of four proposed earlier, the number of cyclic shifts, i.e. orthogonal sequences per CAZAC (e.g. ZC) mother sequence and the number of CAZAC (e.g. ZC) sequences required to generate 512 total resource opportunities.

Wideband Pilot

Given the preamble carries the reduced UE-ID, a subsequent message will be necessary to carry the actual resource request, and a three-step procedure will be used. The reduced UE ID is first sent over the preamble (step 1), and then upon NodeB acknowledgment consisting of a standard UL resource grant (step 2), the actual resource request is sent over UL scheduled channels (step 3).

Due to the three-step procedure, UL scheduled data always follows the SR preamble. Hence, the Node B must allocate some UL standard resource to the UE for its 1$^{st}$ UL data transmission. It was shown above that the preamble bandwidth optimization with respect to detection performance and number of resource opportunities leads to a narrow bandwidth; as a result the preamble cannot be used for channel sounding. In the absence of any knowledge of the UL frequency response over the system bandwidth, the Node B only has two options: 1) allocate distributed resource, 2) allocate blindly localized resource.

The performance benefit of optimizing with respect to the channel frequency response the allocation of the first assigned UL resource upon preamble detection will now be described. In order to do that, simulations were performed comparing three types of allocation: 1) localized resource block without frequency scheduling (blind allocation), 2) localized resource block with frequency scheduling, and 3) distributed resource block. The simulations covered the following cases: 3 and 60 km/h, 1 and 2 TTI scheduling delay.

Figure 13A:
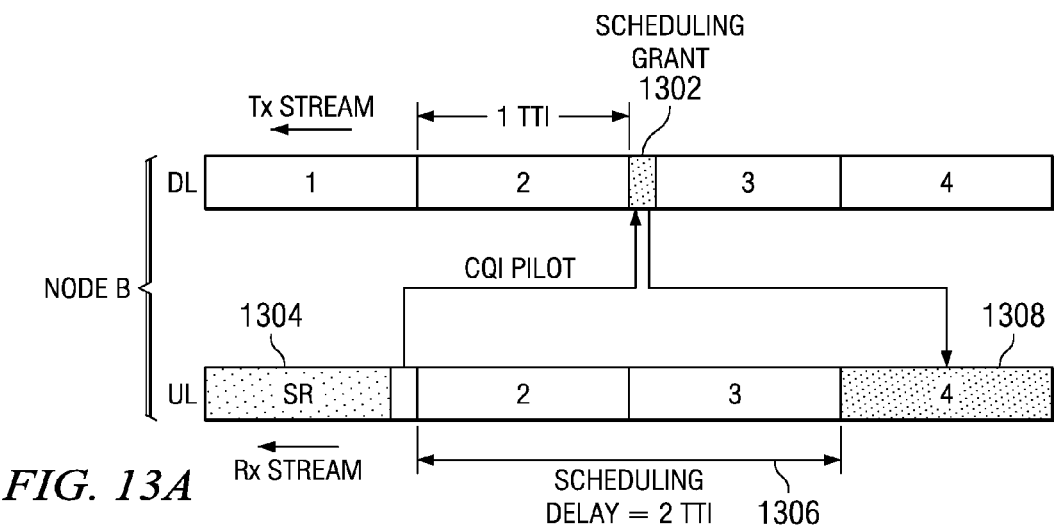
FIGS. 13A, 13B and 13C each illustrate scheduling delays resulting from various embodiments of a scheduling request.
Figure 13B:
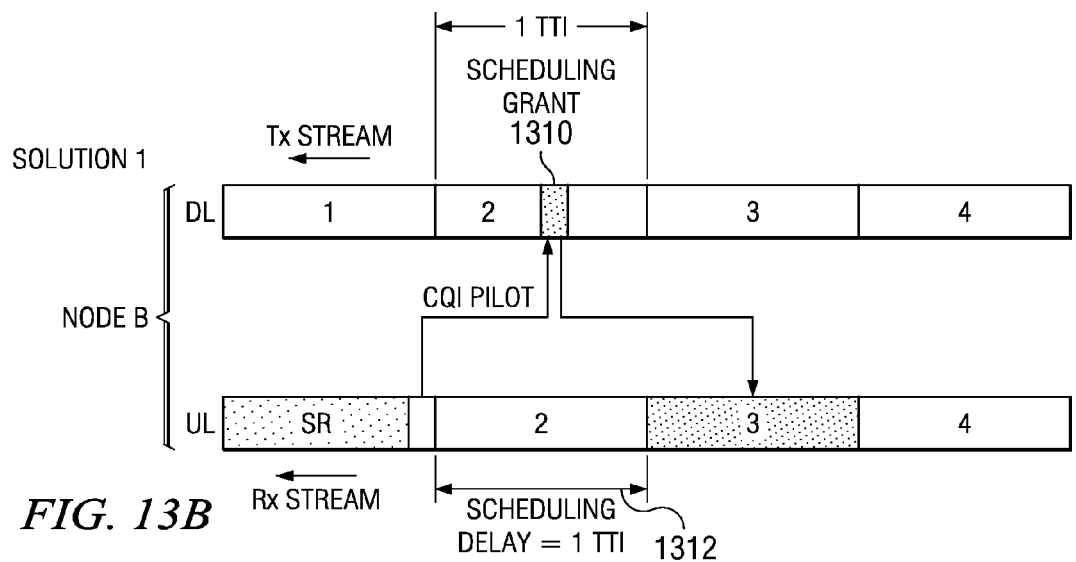
Figure 13C:
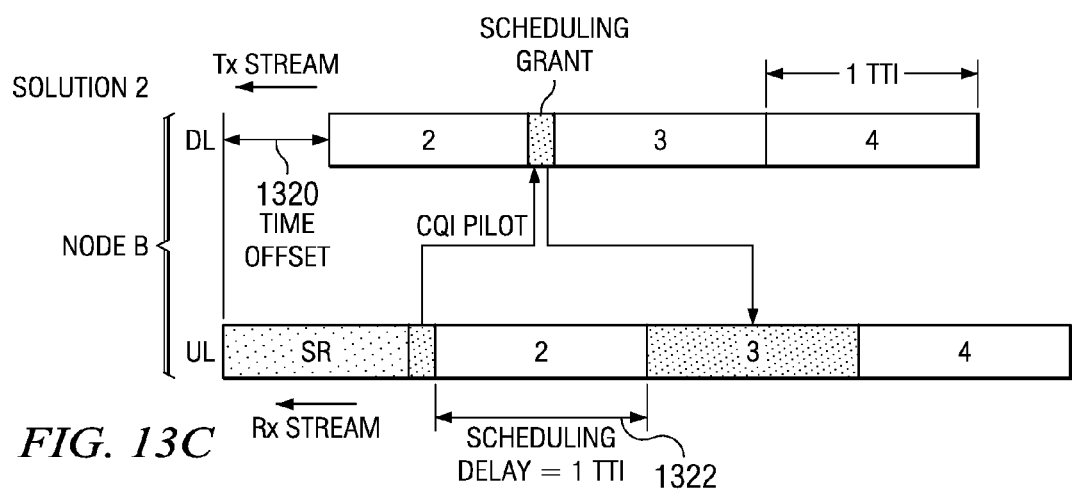

A scheduling delay between the preamble and the following data was modeled to reflect the non-instantaneous scheduling request closed-loop latency. If DL control signaling is mapped into the first symbol 1302 of a DL sub-frame, then a minimum delay 1306 of two TTI's to schedule the first post-preamble UL data 1308 after an SR 1304 occurs, as shown in FIG. 13A. However, this can be solved by either transmitting the scheduling grant in the middle 1310 of the DL TTI as illustrated in FIG. 13B or by introducing time offset 1320 between UL and DL streams as illustrated in FIG. 13C. Both solutions allow reducing the minimum scheduling delay 1312, 1322 of the first post-preamble UL data to one sub-frame only.

In order to secure its transmission, only one RB (12 sub-carriers) over 1 ms TTI is allocated to the first post preamble UL scheduled data. The scheduling bandwidth is 1.25 MHz, which is close to the 1.44 MHz scheduling bandwidth of the SRA Based on the simulation described above, it can be observed that localized frequency scheduling always outperforms other allocation methods for both 3 km/h and 60 km/h UE speeds. Given the large coherence time at 3 km/h, the scheduling delay only has an impact on the 60 km/h UE, where a degradation of 1.5 dB is observed between two and one TTI scheduling delay at 10% BLER.

TABLE 3

Number of orthogonal sequences and CAZAC (e.g. ZC) mother sequences for 512 resource opportunities

| Sequence length | Preamble/ RS duration (μs) | # of freq. blocks | # of root ZC sequences | # cyclic shifts per ZC seq. | Cyclic shift (samples) | Total # of opportunities |
|---|---|---|---|---|---|---|
| 283 | 866.67 | 4 | 2 | 64 | 4 | 512 |

Given the benefit of the localized frequency scheduling method over other methods, it is preferable to use it for the allocation of the first assigned UL resource upon preamble detection.

The wideband pilot transmitted in conjunction with the SR preamble, as illustrated in FIG. 2 and FIGS. 4-7 has the same structure as the existing sounding reference signal (SRS) and aims at providing means for channel sounding to best choose the resource block for post-preamble scheduled data.

Wideband pilots of different preambles are multiplexed in CDM, in the same way as the SRS are multiplexed in a regular UL sub-frame symbol and multiple preambles are multiplexed in the same frequency block: by cyclic shifting a CAZAC (e.g. ZC) root sequence to generate orthogonal codes. Similarly, up to twelve pilots can be multiplexed. As a result, given the 512 total resource opportunities available from the preamble, pilot collisions are unavoidable. Wideband pilot contention is mitigated by dividing the 512 resource opportunities into 12 sets of ~42-43 sequences. Each such set is associated to one of the twelve wideband pilot orthogonal sequences. When selecting a preamble sequence based on its reduced UE ID, the UE also selects the wideband pilot sequence associated with the sequence set its preamble sequence belongs to.

Based on the detected sequences, the NodeB also detects when two or more UE's selected the same wideband pilot in the same SR slot resulting in contention on the wideband pilot. Wideband RS and preamble are viewed separately. The SR channel remains contention-free even if some collisions occur on the wideband RS. The scheduling request will always be addressed by the NodeB because it will always be detected without ambiguity on the contention-free preamble, which is important to maintaining throughput. When there is no collision on the wideband pilot, the nodeB will also have the possibility to frequency-dependent schedule the post preamble message. In case of wideband pilot collision, no channel quality estimation is possible, so no frequency-dependent scheduling is done; in this case the NodeB will just schedule the post-preamble message "blindly". The performance of the message transmission will not be as good as in the former case, but it will still go through, even if it requires some HARQ retransmissions. So, contention of the wideband RS will impact the overall latency of the procedure, but won't compromise its success.

Assuming a uniform random selection of the preamble sequence, the probability per UE that the same wideband pilot sequence was chosen by one or more other UE's can be predicted by the collision probability analysis. One analysis shows that even considering a high offered load of 2 SR attempts per SR time slot, the wideband pilot collision probability per UE is below 15%.

Referring again to FIG. 8, there is a block diagram showing an apparatus in accordance with an embodiment of the present disclosure. Apparatus 2400 comprises ZC Root Sequence Selector 2401, Cyclic Shift Selector 2402, Repeat Selector 2403, ZC Root Sequence Generator 2404, Cyclic Shifter 2405, DFT in 2406, Tone Map 2407, other signals or zero-padding in 2411, IDFT in 2408, Repeater in 2409, optional repeated samples 2412, Add CP in 2410, and the schedule request signal in 2413. Elements of the apparatus may be implemented as components in a fixed or programmable processor. In some embodiments, the IDFT block in 2408 may be implemented using an Inverse Fast Fourier Transform (IFFT), and the DFT block in 2406 may be implemented using a Fast Fourier Transform (FFT). Apparatus 2400 is used to select and perform the schedule request preamble signal transmission as follows. The UE performs selection of the CAZAC (e.g. ZC) root sequence using the ZC Root Sequence Selector 2401 and the selection of the cyclic shift value using the Cyclic Shift Selector 2402. Next, UE generates the CAZAC (e.g. ZC) sequence using the ZC Root Sequence Selector 2404. Then, if necessary, the UE performs cyclic shifting of the selected CAZAC (e.g. ZC) sequence using the Cyclic Shifter 2405. The UE performs DFT (Discrete Fourier Transform) of the cyclically shifted CAZAC (e.g. ZC) sequence in DFT 2406. The result of the DFT operation is mapped onto designated set of tones (sub-carriers) using the Tone Map 2407. Additional signals or zero-padding 2411, may or may not be present. The UE next performs IDFT of the mapped signal using the IDFT 2408. The size of the IDFT in 2408 may optionally be larger than the size of DFT in 2406. Block-Repetition of the IDFT-ed signal is optional, and performed using 2409. Note that the repeated signals 2412 represent optional repeated samples. This repetition can be applied when the preamble transmission occupies two or more sub-frames. An optional cyclic prefix (CP) can be added using 2410, to arrive at the schedule request signal 2413. The schedule request signal 2413 is transmitted over the air.

FIG. 9 is a block diagram showing an apparatus in accordance with an alternative embodiment of the present disclosure. Apparatus 2500 comprises CAZAC (e.g. ZC) Root Sequence Selector 2501, Cyclic Shift Selector 2502, Repeat Selector 2503, CAZAC (e.g. ZC) Root Sequence Generator 2504, Cyclic Shifter 2505, DFT in 2506, Tone Map 2507, other signals or zero-padding in 2511, IDFT in 2508, Repeater in 2509, optional repeated samples 2512, Add CP in 2510, and the schedule request signal in 2513. Elements of the apparatus may be implemented as components in a fixed or programmable processor. In some embodiments, the IDFT block in 2508 may be implemented using an Inverse Fast Fourier Transform (IFFT), and the DFT block in 2506 may be implemented using a Fast Fourier Transform (FFT). Apparatus 2500 is used to select and perform the schedule request preamble signal transmission as follows. The UE performs selection of the CAZAC (e.g. ZC) root sequence using the ZC Root Sequence Selector 2501 and the selection of the cyclic shift value using the Cycle Shift Selector 2502. Then, UE generates the CAZAC (e.g. ZC) sequence using the ZC Root Sequence Generator 2504. The selected CAZAC (e.g. ZC) sequence is transformed using DFT in 2506. The result of the DFT operation is then mapped onto designated set of tones (sub-carriers) using the Tone Map 2507. Additional signals or zero-padding 2511, may or may not be present. The UE then performs IDFT of the mapped signal using 2508. Using the Cyclic Shifter 2505, the selected value of the cyclic shift is applied to the IDFT-ed signal. The value of the cyclic shift is obtained from the Cyclic Shift Selector 2502. Block-Repetition of the cyclically shifted IDFT-ed signal is optional, and performed using the Repeater 2509. Note that 2512 represents optional repeated samples. This repetition can be applied when the preamble transmission occupies two or more sub-frames. An optional cyclic prefix (CP) can then be added using 2510 to arrive at the schedule request signal 2513. The schedule request signal 2513 is transmitted over the air.

FIG. 10 is a block diagram showing an apparatus in accordance with a third embodiment of the present disclosure. Apparatus 2600 comprises ZC Root Sequence Selector 2601, Cyclic Shift Selector 2602, Repeat Selector 2603, ZC Root Sequence Generator 2604, Cyclic Shifter 2605, Tone Map 2607, other signals or zero-padding in 2611, IDFT in 2608, Repeater in 2609, optional repeated samples 2612, Add CP in 2610, and the schedule request signal in 2613. Elements of the apparatus may be implemented as components in a fixed or programmable processor. In some embodiments, the IDFT block in 2608 may be implemented using an Inverse Fast Fourier Transform (IFFT). Apparatus is 2600 used to select and perform the schedule request preamble signal transmission as follows. The UE performs selection of the ZC CAZAC root sequence using ZC Root Sequence Selector 2601 and the selection of the cyclic shift value using Cyclic Shift Selector 2602. Then, UE generates the ZC sequence using ZC Root Sequence Generator 2604. The selected ZC sequence is mapped onto a designated set of tones (sub-carriers) using Tone Map 2607. Additional signals or zero-padding 2611, may or may not be present. The UE then performs IDFT of the mapped signal using 2608. Using Cyclic Shifter 2605, the selected value of the cyclic shift is applied to the IDFT-ed signal. The value of the cyclic shift is obtained from the Cyclic Shift Selector 2602. Block-Repetition of the cyclically shifted IDFT-ed signal is optional, and performed using 2609. Note that 2612 represents optional repeated samples. This repetition can be applied when the preamble transmission occupies two or more sub-frames. An optional cyclic prefix (CP) can then be added using 2610, to arrive at the schedule request signal 2613. The schedule request signal 2613 is then transmitted over the air.

In various embodiments of the present disclosure, the set of allowed cyclic shifts can be dimensioned in accordance with the physical limitations of the cell, which include cells maximum delay spread of the channel. For example, a single root CAZAC (e.g. ZC) sequence may be cyclically shifted by any integer multiple of the cell's maximum delay spread, to generate a set of pre-defined schedule request preamble signals. The maximum delay spread of the channel calls for conversion to the sampling unit of the sequence. Thus, if the maximum delay spread of the channel is given as "x," then possible choices for cyclic shift values can be dimensioned as n from $\{0, x, 2x, \ldots, (u-1)x\}$ where ux can't exceed the length of the sequence which is being cyclically shifted.

Round trip delay is a function of cell size, where cell size is defined as the maximum distance d at which a UE can interact with the cell's base station, and can be approximated using the formula t=6.67 d, where t and d are expressed in µs and km respectively. The round-trip delay is the delay of the earlier radio path. A typical earlier path is the line-of-sight path, defined as the direct (straight-line) radio path between the UE and the base station. When the UE is surrounded by reflectors, its radiated emission is reflected by these obstacles, creating multiple, longer traveling radio paths. Consequently, multiple time-delayed copies of the UE transmission arrive at the base station. The time period over which these copies are delayed is referred to as "delay spread," and for example, in some cases, 5 µs may be considered a conservative value thereof.

When the set $\{0, x, 2x, \ldots, (u-1)x\}$ of cyclic shifts generates an insufficient number of distinct schedule request preamble signals, then additional root CAZAC sequences (for example, for M=2 and M=3) can be employed for schedule request preamble signal generation. In this situation, selection of prime N proves to be advantageous, because with N prime, the set of possible choices for M is $\{1, 2, \ldots, (N-1)\}$. Thus, in one embodiment of the present disclosure, distinct schedule request preamble signals are identified by the set of possible choices for the cyclic shift value and the set of allowed choices for M. In addition to providing supplementary intra-cell sequences, when used in neighboring cells, these additional root CAZAC (e.g. ZC) sequences provide good inter-cell interference mitigation. Thus, during the cellular system design, a scenario where adjacent cells use identical root sequences should be avoided. This can be achieved through a number of possible techniques, including but not limited to: cellular system planning, sequence hopping, or a combination thereof.

The set of allowed schedule request preamble signals is made known to the UE prior to the schedule request transmission. This can be achieved in a number of different ways, including hard-wiring this information in the UE. The preferred approach, however, is for the Node B to broadcast information which allows the UE to infer the set of allowed schedule request preamble signals. For example, the Node B can broadcast: 1) which root CAZAC sequences are permitted, and 2) which values of the "cyclic-shift" are permitted. Also, a unique scheduling request resource is allocated to each UL synchronized UE. In order to do that, the NodeB uses dedicated transmissions for each UE. The UE reads the broadcasted information, identifies its allocated resource among the set of schedule request preamble signals, and performs the schedule request transmission. Note that the identification of the schedule request preamble signal amounts to the identification of the root ZC CAZAC sequence, the selection of the value of the cyclic shift, and possibly the selection of the frequency bin (in case multiple bins are configured per schedule request time slot). In certain cases, additional broadcasted information may be added, such as whether or not the UE needs to perform signal repetition. Overall, this approach, based on broadcasting the added information, is preferred, in that the approach allows for optimizing the cellular network based on physical limitations, such as the maximum delay spread in a cell and cell size. Any given UE is then flexible enough to be used in all types of cells, and system optimization is performed by the cell design.

Sequences obtained from cyclic shifts of a single CAZAC root sequence (ZC or otherwise) are orthogonal to one another if the cyclic shift value is larger than the maximum time uncertainty of the received signal, including the delay spread and the spill-over. In other words, the cyclic shifts create zones with zero correlation between distinct schedule request preamble signals. Thus, a cyclically shifted sequence can be observed without any interference from sequences created using different cyclic shifts. Sequences obtained from cyclic shifts of different Zadoff-Chu (ZC) sequences are not orthogonal, but have optimal cross-correlation as long as the sequence length is a prime number. Therefore, in various embodiments, orthogonal sequences are preferred over non-orthogonal sequences. For this reason, additional Zadoff-Chu (ZC) root sequences may be used when the required number of sequences cannot be generated by cyclic shifts of a single root sequence. As a result, cyclic shift dimensioning is of primary importance in the schedule request sequence design. As mentioned above, the cyclic shift value is dimensioned to account for the maximum time uncertainty in schedule request preamble reception. This time uncertainty reflects the maximum expected UE timing uncertainty when the UE is UL synchronized plus the delay spread. Thus, cyclic shift dimensioning ensures that distinct schedule request signals, generated from a single root CAZAC sequence, are received within the zone of zero mutual correlation.

FIG. 11 shows an embodiment of a schedule request signal receiver. This receiver advantageously makes use of the time and frequency domain transforming components used to map and de-map data blocks in the up-link sub-frame. The received schedule request signal 2701; comprising cyclic prefix and schedule request preamble signal, is input to cyclic prefix removal component 2702 which strips cyclic prefix from the schedule request signal producing signal 2703. Frequency domain transforming component DFT 2704 couples to cyclic prefix removal component 2702. Frequency domain transforming component 2704 converts signal 2703 into sub-carrier mapped frequency tones 2705. Sub-carrier de-mapping component 2706 is coupled to frequency domain transforming component 2704. Sub-carrier de-mapping component 2706 de-maps sub-carrier mapped frequency tones 2705 to produce useful frequency tones 2707. Product component 2711 is coupled to both sub-carrier de-mapping component 2707 and frequency domain transforming component 2709. Frequency domain transforming component (DFT) 2709 converts a preamble root sequence 2710, such as a prime length Zadoff-Chu sequence, into a corresponding set of pilot frequency tones 2708. Complex conjugation of pilot frequency tones 2708 is performed using 2721, to produce samples 2720. Product component 2711 computes a tone by tone complex multiplication of received frequency tones 2707 with samples 2720 to produce a set of frequency tones 2712. Time domain transforming component (IDFT) 2713 is coupled to product component 2711. Time domain transforming component 2713 converts multiplied frequency tones 2712 into correlated time signal 2714. Correlated time signal 2714 contains concatenated power delay profiles of the cyclic shift replicas of the preamble root sequence 2710. Energy detection block 2715 is coupled to time domain transforming block 2713. Energy detection block 2715 identifies received preamble sequences by detecting the time of peak correlation between received schedule request signal 2701 and preamble root sequence 2710. Note that frequency domain transforming component 2709 is called for when using the transmitters illustrated in FIG. 8 or FIG. 9. When using the transmitter of FIG. 10, frequency domain transforming component 2709 may be omitted.

Figure 14:
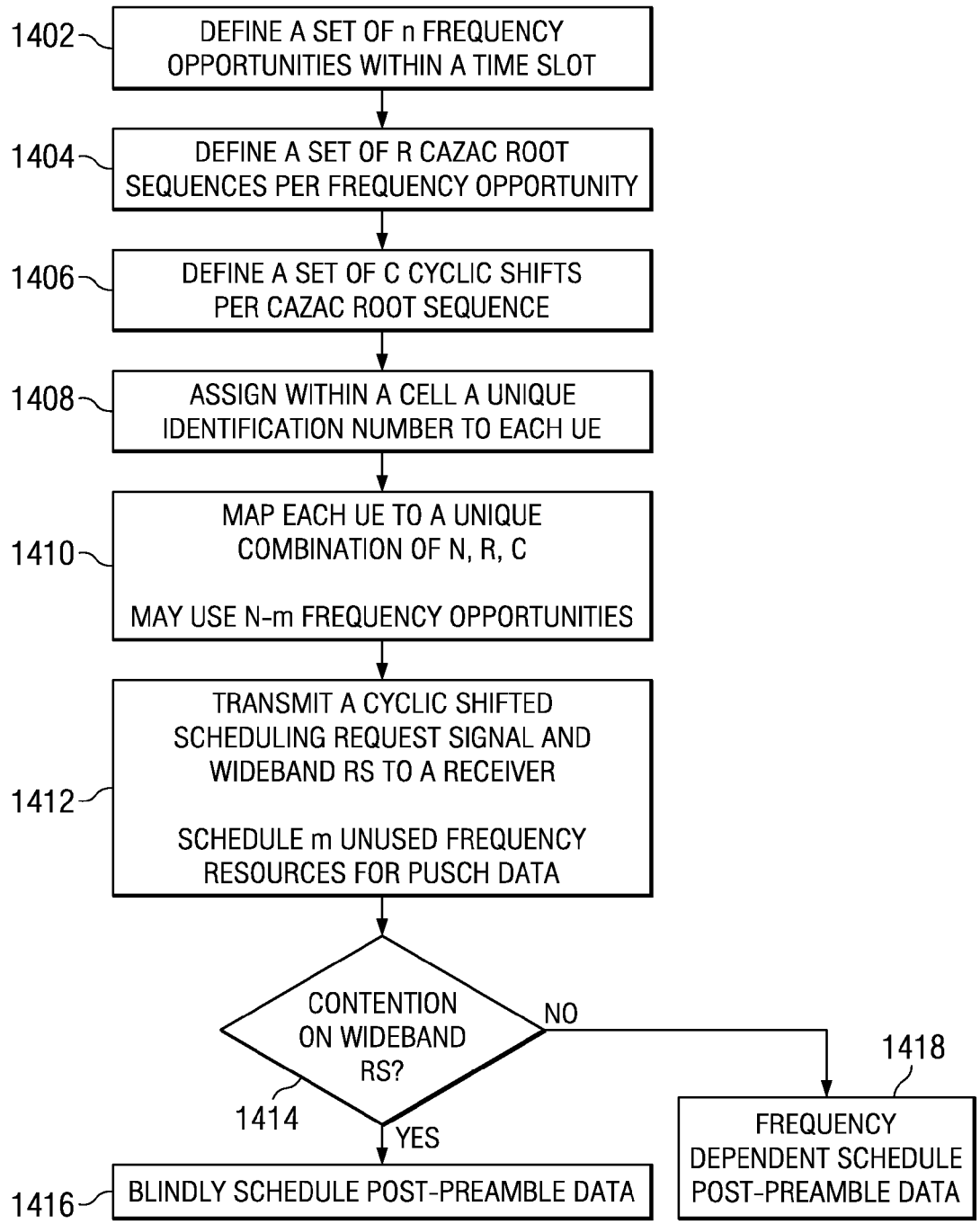
FIG. 14 is a flow diagram illustrating transmission of a contention free scheduling request in the cellular network of FIG. 1.

FIG. 14 is a flow diagram illustrating transmission of a contention free scheduling request in the cellular network of FIG. 1. A set of N frequency opportunities is defined 1402 within a scheduling request slot. A set of R CAZAC root sequences is defined 1404 per frequency opportunity. A set of C cyclic shifts is defined 1406 per CAZAC root sequence.

A unique identification number is assigned 1408 to each user equipment (UE) that is in a synchronized state in a given cell. Each active UE is then mapped 1410 to a unique combination of one of the N frequency opportunities, one of the R CAZAC root sequences and one of the C cyclic shifts. In this manner, up to 512 UE can be uniquely mapped in a single scheduling request slot.

A cyclic shifted preamble sequence for a given UE is transmitted 1412 as a scheduling request on the mapped frequency, CAZAC root sequence and cyclic shift opportunity, wherein the unique identification number of the given UE is encoded by the combination of the frequency opportunity, CAZAC root sequence opportunity, and amount of cyclic shift, such that up to all of the plurality of UE can transmit a schedule request (SR) in a non-contentious manner in one schedule request slot.

A wideband reference signal selected from a set of orthogonal sequences is transmitted 1412 in conjunction with the cyclic shifted preamble by the given UE, such that contention among the plurality of UE may occur during transmission of the wideband reference signal. If contention among the wideband RS occurs, then a post-preamble message is blindly scheduled 1416; however if no contention occurs on the wideband reference signal then the post-preamble message is scheduled 1418 using frequency dependent scheduling based on channel quality information derived from the non-contentious wideband RS by the NodeB.

If less than a full compliment of UL synchronized UE are being supported, then it may be possible to use less than N frequency opportunities 1412 for scheduling requests. These load variations are assumed to be at very low rate (minutes or even hours). In the case of load increase, the SR resources are assigned incrementally, for example, starting with only one frequency block to UEs. Therefore additional frequency blocks are allocated on an as needed basis; i.e. as more UEs come in the UL synchronized state and are assigned resources in the additional frequency blocks. In the case of load decrease, as more UEs leave the UL synchronized state and therefore release their SR resource the resource allocations might become fragmented across frequency blocks. Therefore the base station may decide to remove one frequency block and then assign the corresponding UEs to the remaining available resources in the remaining frequency blocks. This re-assignment would need a MAC message in DL for each of these re-assigned UE's.

Figure 15:
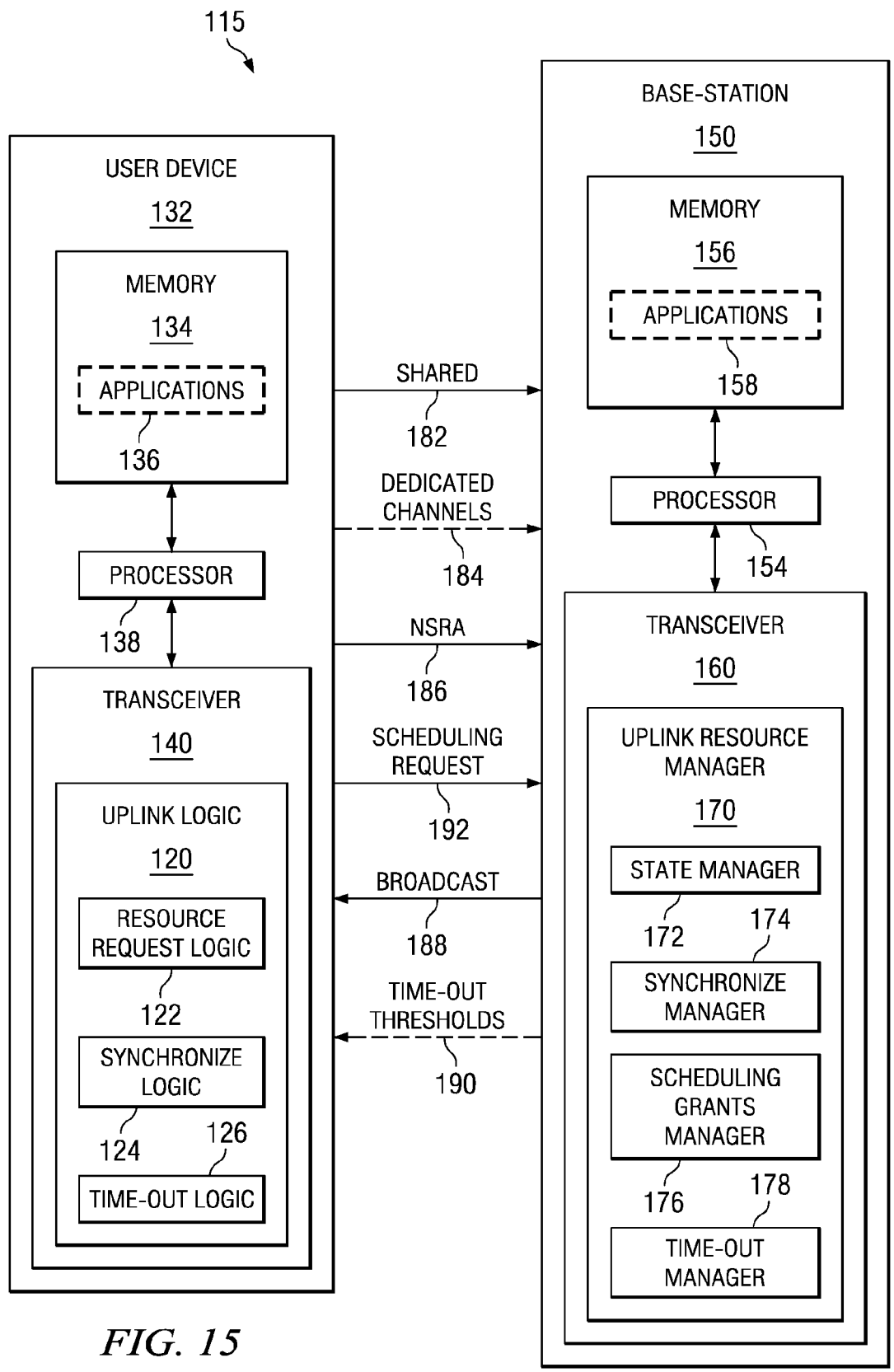
FIG. 15 is a block diagram illustrating an representative user equipment and nodeB in the network of FIG. 1.

FIG. 15 illustrates a wireless networking system 115 in accordance with embodiments of the disclosure. As shown in FIG. 15, the wireless networking system 115 comprises a user device 132 in communication with a base-station 150. The user device 132 may represent any of a variety of devices such as a server, a desktop computer, a laptop computer, a cellular phone, a Personal Digital Assistant (PDA), a smart phone or other electronic devices. In some embodiments, the electronic device 132 communicates with the base-station 150 based on a LTE or E-UTRAN protocol. Alternatively, another communication protocol now known or later developed is used.

As shown, the electronic device 132 comprises a processor 138 coupled to a memory 134 and a transceiver 140. The memory 134 stores applications 136 for execution by the processor 138. The applications 136 could comprise any known or future application useful for individuals or organizations. As an example, such applications 136 could be categorized as operating systems, device drivers, databases, multimedia tools, presentation tools, Internet browsers, emailers, Voice Over Internet Protocol (VOIP) tools, file browsers, firewalls, instant messaging, finance tools, games, word processors or other categories. Regardless of the exact nature of the applications 136, at least some of the applications 136 may direct the user device 132 to transmit uplink signals to the base-station 150 periodically or continuously via the transceiver 140. Over time, different uplink transmissions from the user device 132 may be high priority (time-critical) or low priority (non-time critical). In at least some embodiments, the user device 132 identifies a Quality of Service (QoS) requirement when requesting an uplink resource from the base-station 150. In some cases, the QoS requirement may be implicitly derived by the base-station 150 from the type of traffic supported by the user device 132. As an example, VOIP and gaming applications often involve high priority uplink transmissions while High Throughput (HTP)/Hypertext Transmission Protocol (HTTP) traffic involves low priority uplink transmissions.

As shown in FIG. 15, the transceiver 140 comprises uplink logic 120, which enables the user device 132 to request an uplink resource from the base-station 150 and upon a successful request to send uplink transmissions to the base-station 150. In FIG. 15, the uplink logic 120 comprises resource request logic 122, synchronize logic 124, and time-out logic 126. As would be understood by one of skill in the art, the components of the uplink logic 120 may involve the physical (PHY) layer and/or the Media Access Control (MAC) layer of the transceiver 140.

In at least some embodiments, the resource request logic 122 detects when the user device 132, in absence of any valid uplink resource grant, needs to send an uplink transmission to the base-station 150 and submits a corresponding scheduling request. As previously mentioned, the request may indicate a priority level or QoS requirement for the uplink transmission. If the user device 132 is not uplink synchronized, the scheduling request is made using non-synchronized random access (RA) 186, which is potentially contentious depending on how many other user devices also need to use the RA at the same time (e.g., for scheduling requests or uplink synchronization maintenance). Alternatively, if the user device 132 is uplink synchronized, the resource request may be submitted via a contention-free scheduling request channel 192 which may be available to the user device 132.

In at least some embodiments, the scheduling request channel 192 is part of the dedicated channels 184. The dedicated channels 184 represent uplink synchronized channels which are dedicated to a particular purpose and which are selectively accessible to one or more user devices. Another example of dedicated channel is the sounding reference signal (SRS). The SRS is a standalone reference signal (or pilot) which provides means to the base-station to perform channel quality information (CQI) estimation for frequency dependent scheduling, to maintain uplink synchronization, and to implement link adaptation and power control for each user.

If the user device 132 previously obtained a resource allocation from the base station 150 and the resource allocation has not expired, uplink transmissions can be sent via a shared channel 182 (i.e., a channel shared with other user devices based on time and division multiplexing) in the form of a MAC Packet Data Unit (PDU) transmission. In at least some embodiments, the resource request logic 122 also detects when the user device 132, with at least one valid uplink resource grant, needs to update its current allocated uplink resource(s) (e.g., if the user device 132 needs more resources because it received more data in its transmission buffer) and submits a corresponding scheduling request. Since the user device 132 already has valid uplink grants, it is uplink synchronized, and the resource request may be either embedded in a MAC PDU sent on these valid grants on the uplink shared channel 182, or submitted via the scheduling request channel 192.

To use the shared channel 182 or the scheduling request channel 192, the user device 132 receives a unique identifier from the base-station 150. In some embodiments, the unique identifier is explicitly provided by the base-station 150 (e.g., the base-station 150 broadcasts a multi-bit unique identifier to the user device 132 for use with the shared channel 182). In alternative embodiments, the unique identifier is implicitly provided by the base-station 150 (e.g., the base-station 150 provides a one-to-one mapping between the user device 132 and a physical uplink resource of the scheduling request channel 192).

The synchronize logic 124 enables the user device 132 to maintain a particular synchronization for uplink transmissions via the shared channel 182 or other uplink synchronized channels (e.g., the SRS or the scheduling request channel 192). In some embodiments, the synchronize logic 124 supports time and frequency adjustments based on a predetermined protocol and/or instructions from the base-station 150. Once the user device 132 is synchronized, the synchronization can be periodically updated based on timers and/or information exchanged between the user device 132 and the base-station 150. For example, if the user device 132 is synchronized and has at least one scheduling grant from the base-station 150, then the synchronize manager 174 of the base-station 150 can maintain the user device's synchronization based on ongoing uplink transmissions from the user device 132 via the shared channel 182.

If the user device 132 is synchronized but does not have a scheduling grant from the base-station 150, then the synchronize manager 174 of the base-station 150 can maintain the user's synchronization based on an RA transmission 186. Alternatively, if the user device 132 is synchronized but does not have a scheduling grant from the base-station 150, then the synchronize manager 174 of the base-station 150 can maintain the user's synchronization based on information transmitted via one of the dedicated channels 184 (e.g., using a SRS or an autonomous synchronization request from the user device 132 through the scheduling request channel 192). By appropriately synchronizing uplink transmissions of the user device 132, interference to and from the transmissions of other user devices can be avoided and orthogonal multiplexing is maintained.

As shown in FIG. 15, the base-station 150 comprises a processor 154 coupled to a memory 156 and a transceiver 170. The memory 156 stores applications 158 for execution by the processor 154. The applications 158 could comprise any known or future application useful for managing wireless communications. At least some of the applications 158 may direct the base-station to manage transmissions to or from the user device 132.

As shown in FIG. 15, the transceiver 160 comprises an uplink resource manager 170, which enables the base-station 150 to selectively allocate uplink resources to the user device 132. In FIG. 15, the uplink resource manager 170 comprises a state manager 172, a synchronize manager 174, a scheduling grants manager 176 and a time-out manager 178. As would be understood by one of skill in the art, the components of the uplink resource manager 170 may involve the physical (PHY) layer and/or the Media Access Control (MAC) layer of the transceiver 160.

In at least some embodiments, the state manager 172 determines whether to assign the user device 132 to a synchronized state or to a non-synchronized state. In at least some embodiments, the user device 132 can request to be assigned to the synchronized state using RA 186.

If the user device 132 is accepted into the synchronized state, a reduced identifier is provided to the user device 132. The reduced identifier enables the user device 132 to send uplink transmissions via the shared channel 182 and new resource requests via the scheduling requests channel 192. In some embodiments, the state manager 172 enables the reduced identifier to be explicitly provided to the user device 132 (e.g., broadcasting a multi-bit unique identifier to the user device 132 for use with the shared channel 182). In alternative embodiments, the state manager 172 enables the unique identifier to be implicitly provided to the user device 132 (e.g., providing a one-to-one mapping between the user device 132 and a physical uplink resource of the base-station 150). If the user device 132 becomes non-synchronized due to a time-out or any other reason, the state manager 172 reassigns the user device 132 to the non-synchronized state and releases the reduced identifier and any associated uplink resource that was assigned to the user device 132.

The synchronize manager 174 maintains user devices in synchronization for uplink transmissions via the shared channel 182 or any dedicated channel 184. In order to do so, the synchronize manager 174 estimates the timing error of the uplink transmissions of the user device 132 on either the shared channel 182, a dedicated channel 184 (e.g., SRS) or the RA 186. Then, the synchronize manager 174 sends back a timing advance (TA) command to the user device 132, that will be executed by the synchronize logic 124. By appropriately synchronizing uplink transmissions of the user device 132, the synchronize manager 174 avoids interferences between uplink transmissions of the user device 132 and uplink transmissions of other user devices and orthogonal multiplexing is maintained.

The scheduling grants manager 176 selectively determines when synchronized user devices will be scheduled on the shared channel 182. For example, the scheduling grants manager 176 may assign scheduling grants in response to new resource requests from user device 132 sent through the scheduling request channel 192.

If more than a threshold amount of time passes during which the user device 132 does not send any uplink transmissions, a time-out may occur. The time-out manager 178 determines when a time-out occurs based on one or more time-out thresholds 190. In at least some embodiments, the time-out manager 178 implements timers or counters to track the amount of time that passes between uplink transmissions for all synchronized user devices. The time-out thresholds 190 may be predetermined or may be determined, for example, based on the number of user devices in communication with the base-station.

In at least some embodiments, a time-out threshold causes user devices to enter the non-synchronized state. Preferably, the entrance of user devices to the non-synchronized state does not depend on exchanging messages between the base station 150 and user devices. In other words, both user devices and the base-station 150 can track the passage of time separately and independently determine that a user device is in a non-synchronized state. In case a user device transitions to the non-synchronized state, any existing uplink grant of this user device is released.

Figure 16:
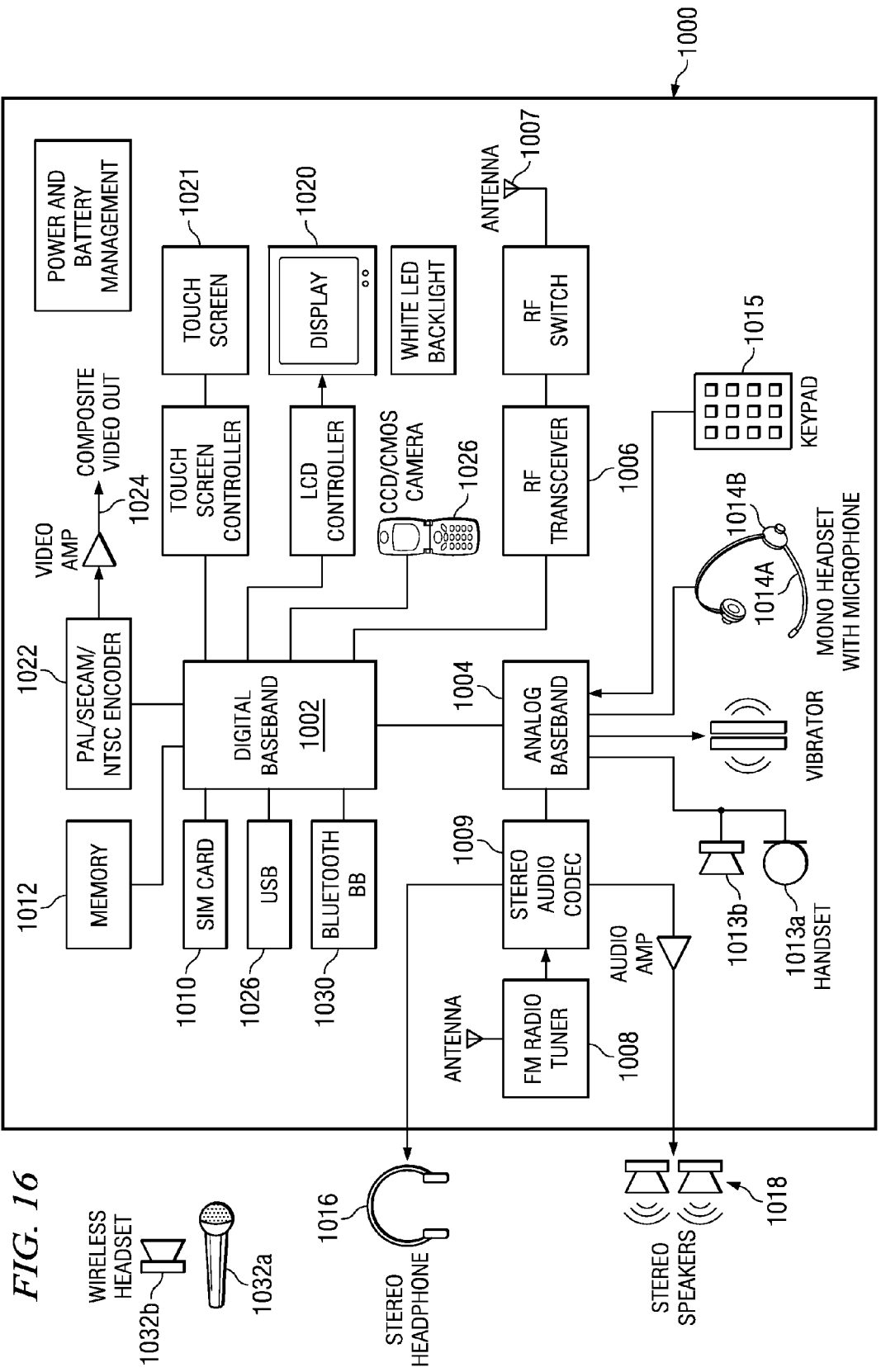
FIG. 16 is a block diagram illustrating an embodiment of cellular telephone for use in the system of FIG. 1.

FIG. 16 is a block diagram of a UE 1000 that uses scheduling requests comprising a cyclic shifted preamble and wideband reference signal, as described above. Digital system 1000 is a representative cell phone that is used by a mobile user. Digital baseband (DBB) unit 1002 is a digital processing processor system that includes embedded memory and security features.

Analog baseband (ABB) unit 1004 performs processing on audio data received from stereo audio codec (coder/decoder) 1009. Audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc. ABB 1004 receives a voice data stream from handset microphone 1013$a$ and sends a voice data stream to handset mono speaker 1013$b$. ABB 1004 also receives a voice data stream from microphone 1014$a$ and sends a voice data stream to mono headset 1014$b$. Usually, ABB and DBB are separate ICs. In most embodiments, ABB does not embed a programmable processor core, but performs processing based on configuration of audio paths, filters, gains, etc being setup by software running on the DBB. In an alternate embodiment, ABB processing is performed on the same OMAP processor that performs DBB processing. In another embodiment, a separate DSP or other type of processor performs ABB processing.

RF transceiver 1006 includes a receiver for receiving a stream of coded data frames from a cellular base station via antenna 1007 and a transmitter for transmitting a stream of coded data frames to the cellular base station via antenna 1007. A scheduling request signal is transmitted when data is ready for transmission and scheduling commands can be received from the serving base station. Among the scheduling commands can be a command (implicit or explicit) to use a particular sub-channel for transmission that has been selected by the serving NodeB. Transmission of the scheduled resource blocks are performed by the transceiver using the sub-channel designated by the serving NodeB. Frequency hopping may be implied by using two or more sub-channels as commanded by the serving NodeB. In this embodiment, a single transceiver supports OFDMA and SC-FDMA operation but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by cell phone 1000.

The basic SC-FDMA DSP radio can include DFT, subcarrier mapping, and IFFT (fast implementation of IDFT) to form a data stream for transmission and DFT, subcarrier de-mapping and IFFT to recover a data stream from a received signal, as described in more detail in FIGS. 8-11. DFT, IFFT and subcarrier mapping/de-mapping may be performed by instructions stored in memory 1012 and executed by DBB 1002 in response to signals received by transceiver 1006.

DBB unit 1002 may send or receive data to various devices connected to USB (universal serial bus) port 1026. DBB 1002 is connected to SIM (subscriber identity module) card 1010 and stores and retrieves information used for making calls via the cellular system. DBB 1002 is also connected to memory 1012 that augments the onboard memory and is used for various processing needs. DBB 1002 is connected to Bluetooth baseband unit 1030 for wireless connection to a microphone 1032$a$ and headset 1032$b$ for sending and receiving voice data.

DBB 1002 is also connected to display 1020 and sends information to it for interaction with a user of cell phone 1000 during a call process. Display 1020 may also display pictures received from the cellular network, from a local camera 1026, or from other sources such as USB 1026.

DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder 1022 provides encoding according to PAL/SECAM/NTSC video standards.

As used herein, the terms "applied," "coupled," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. This invention applies in uplink and downlink.

Embodiments of this invention apply to any flavor of frequency division multiplex based transmission. Thus, the concept of valid specification of sub-channels can easily be applied to: OFDMA, OFDM, DFT-spread OFDM, DFT-spread OFDMA, SC-OFDM, SC-OFDMA, MC-CDMA, and all other FDM-based transmission strategies.

A Node B is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

In a general embodiment of the present disclosure, the set of allowed schedule request preamble signals is defined by two other sets: 1) a set of allowed root CAZAC sequences, and 2) a set of allowed modifications to a given root CAZAC sequence. In one embodiment, schedule request preamble signal is constructed from a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in various embodiments of the present disclosure, a UE constructs a schedule request preamble signal by selecting a CAZAC sequence, possibly applying a combination of the described modifications to the selected CAZAC sequence, modulating the modified sequence, and transmitting the resulting schedule request signal over the air.

It is therefore contemplated that the appended claims will cover any such modifications of the embodiments as fall within the true scope and spirit of the invention.

What is claimed is:

1. A method for transmitting a contention free scheduling request in a cellular network, comprising:
    defining a set of N frequency opportunities within a scheduling request slot;
    defining a set of R CAZAC root sequences per frequency opportunity;
    defining a set of C cyclic shifts per CAZAC root sequence;
    assigning within a cell a unique identification number to each of a plurality of user equipment (UE);
    mapping each UE of the plurality of UE to a unique combination of one of the N frequency opportunities, one of the R CAZAC root sequences and one of the C cyclic shifts; and
    transmitting a cyclic shifted preamble sequence for a given UE as a scheduling request on the mapped frequency, CAZAC root sequence and cyclic shift opportunity, wherein the unique identification number of the given UE is encoded by the combination of the frequency opportunity, CAZAC root sequence opportunity, and amount of cyclic shift, such that up to all of the plurality of UE can transmit a schedule request (SR) in a non-contentious manner in one schedule request slot.

2. The method of claim 1, wherein N×R×C is greater than or equal to 512 for each scheduling request slot, such that up to 512 UE can transmit a schedule request in a non-contentious manner per each scheduling request slot.

3. The method of claim 1, further comprising transmitting a wideband reference signal selected from a set of orthogonal sequences in conjunction with the cyclic shifted preamble by the given UE, such that contention among the plurality of UE may occur during transmission of the wideband reference signal.

4. The method of claim 3, further comprising:
    blindly scheduling a post-preamble message if contention occurs; and
    frequency-dependently scheduling a post-preamble message if no contention occurs on the wideband reference signal.

5. The method of claim 1 further comprising:
    determining if the plurality of UE is less than ((N−m)×R×S), where m is a positive integer; and
    wherein the mapping is then performed with N−m frequency opportunities.

6. The method of claim 5, wherein N=4 and m=1, 2, or 3.

7. The method of claim 5, further comprising scheduling physical uplink shared channel (PUSCH) data on the m unused frequency opportunities of the slot.

8. The method of claim 7, wherein the wideband reference signal is located on a PUSCH symbol where a sounding reference signal (SRS) is also located, and wherein a fixed number k of SRS resources is reserved for the contention based SR wideband reference signal resources for each subframe that includes a contention free scheduling request.

9. The method of claim 8, wherein k=12.

10. A user equipment (UE) for transmitting a contention free scheduling request in a cellular network, comprising:
    storage circuitry for storing a selected frequency opportunity from a set of N frequency opportunities within a scheduling request slot, a selected root sequence from a set of R CAZAC root sequences per frequency opportunity, and a selected cyclic shift from a set of C cyclic shifts per CAZAC root sequence;
    circuitry for storing an assigned unique identification number; and
    a transmitter coupled to the storage circuitry operable to transmit a cyclic shifted preamble sequence as a scheduling request on the selected frequency, CAZAC root sequence and cyclic shift opportunity, wherein the unique identification number of the UE is encoded by the combination of the frequency opportunity, CAZAC root sequence opportunity, and amount of cyclic shift, such that a plurality of UE can transmit a schedule request (SR) in a non-contentious manner in one schedule request slot.

11. The user equipment of claim 10, further comprising a shift function coupled d to the storage circuit and to the transmitter, operable to shift the selected root sequence by the selected cyclic shift amount for transmission by the transmitter.

12. The user equipment of claim 10, further comprising a selection function connected to the transmitter operable to select a wideband reference signal from a set of orthogonal sequences and wherein the transmitter is operable to transmit the selected wideband reference signal in conjunction with the cyclic shifted preamble, such that contention among the plurality of UE may occur during transmission of the wideband reference signal.

13. A method for transmitting a contention free scheduling request from a user equipment (UE) in a cellular network, comprising:
    receiving at the UE a selected frequency opportunity mapped from a set of N frequency opportunities within a scheduling request slot;
    receiving at the UE a selected root sequence mapped from a set of R CAZAC root sequences per frequency opportunity;
    receiving at the UE a selected cyclic shift mapped from a set of C cyclic shifts per CAZAC root sequence;
    receiving at the UE an identification number that is unique from each of a plurality of user equipment (UE) within a cell; and
    transmitting a cyclic shifted preamble sequence from the UE as a scheduling request on the selected frequency, CAZAC root sequence and cyclic shift opportunity, wherein the unique identification number of the UE is encoded by the combination of the frequency opportunity, CAZAC root sequence opportunity, and amount of cyclic shift, such that the plurality of UE can transmit a schedule request (SR) in a non-contentious manner in one schedule request slot.

14. The method of claim 13, further comprising transmitting a wideband reference signal selected from a set of orthogonal sequences in conjunction with the cyclic shifted preamble by the UE, such that contention among the plurality of UE may occur during transmission of the wideband reference signal.

15. The method of claim 14, further comprising transmitting physical uplink shared channel (PUSCH) data on one or more unused frequency opportunities of the slot.

16. The method of claim 14, wherein the wideband reference signal is located on a PUSCH symbol where a sounding reference signal (SRS) is also located, and wherein a fixed number k of SRS resources is reserved for the contention based SR wideband reference signal resources for each subframe that includes a contention free scheduling request.

17. A method for transmitting a contention free scheduling request in a cellular network, comprising:
 defining a set of N frequency opportunities within a scheduling request slot;
 defining a set of R CAZAC root sequences per frequency opportunity;
 defining a set of C cyclic shifts per CAZAC root sequence;
 assigning within a cell a unique identification number to each of a plurality of user equipment (UE);
 mapping each UE of the plurality of UE to a unique combination of one of the N frequency opportunities, one of the R CAZAC root sequences and one of the C cyclic shifts; and
 receiving a plurality of transmitted cyclic shifted preamble sequences as scheduling requests in one schedule request slot wherein the cyclic shifted preamble sequence transmitted from each corresponding UE as a scheduling request on the mapped frequency, CAZAC root sequence and cyclic shift opportunity encodes the unique identification number of each UE, such that up to all of the plurality of UE can transmit a schedule request (SR) in a non-contentious manner in one schedule request slot.

18. The method of claim 17, further comprising receiving plurality of wideband reference signals selected from a set of orthogonal sequences transmitted by a portion of the plurality of UE in conjunction with the cyclic shifted preamble transmitted by the portion of UE, such that contention among the portion of UE may occur during transmission of the wideband reference signal.

19. The method of claim 18, further comprising:
 blindly scheduling a post-preamble message for a given UE if contention occurs with that UE's wideband reference signal; and
 frequency-dependently scheduling a post-preamble message for another UE if no contention occurs on the wideband reference signal of the other UE.

20. The method of claim 17 further comprising:
 determining if the plurality of UE is less than $((N-m) \times R \times S)$, where m is a positive integer; and
 wherein the mapping is then performed with N-m frequency opportunities.

21. The method of claim 20, wherein N=4 and m=1, 2, or 3.

22. The method of claim 21, further comprising scheduling physical uplink shared channel (PUSCH) data on the m unused frequency opportunities of the slot.

23. The method of claim 22, wherein the wideband reference signal is located on a PUSCH symbol where a sounding reference signal (SRS) is also located, and wherein a fixed number k of SRS resources is reserved for the contention based SR wideband reference signal resources for each subframe that includes a contention free scheduling request.

* * * * *